US009238560B1

(12) United States Patent
Toba et al.

(10) Patent No.: US 9,238,560 B1
(45) Date of Patent: Jan. 19, 2016

(54) CONVEYANCE DEVICE, IMAGE READING DEVICE AND IMAGE FORMING APPARATUS

(71) Applicant: FUJI XEROX CO., LTD., Tokyo (JP)

(72) Inventors: Takakiyo Toba, Yokohama (JP);
Kazuyuki Koda, Yokohama (JP);
Masato Serikawa, Yokohama (JP);
Takato Kato, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/614,030

(22) Filed: Feb. 4, 2015

(30) Foreign Application Priority Data

Sep. 19, 2014 (JP) ................. 2014-191700
Sep. 19, 2014 (JP) ................. 2014-191702

(51) Int. Cl.
| | |
|---|---|
| *H04N 1/04* | (2006.01) |
| *B65H 3/06* | (2006.01) |
| *B65H 5/06* | (2006.01) |
| *B65H 5/26* | (2006.01) |
| *B65H 7/14* | (2006.01) |

(Continued)

(52) U.S. Cl.
CPC ............ *B65H 3/0669* (2013.01); *B65H 3/0684* (2013.01); *B65H 5/068* (2013.01); *B65H 5/26* (2013.01); *B65H 7/14* (2013.01); *B65H 15/00* (2013.01); *B65H 29/58* (2013.01); *B65H 43/08* (2013.01); *H04N 1/00588* (2013.01); *H04N 2201/0081* (2013.01)

(58) Field of Classification Search
CPC ............ B65H 3/0669; B65H 2801/39; B65H 2403/72; B65H 2404/1115; H04N 1/0058; H04N 1/00702; H04N 1/12; H04N 1/193; H04N 1/00; H04N 1/00602; H04N 1/00615; H04N 1/0062; H04N 1/00652; H04N 1/00655
USPC ............ 271/3.19, 225, 226, 10.13, 110, 160, 271/273, 162, 3.14; 399/111, 167, 106, 399/381, 407, 107, 110, 113, 176, 255, 256, 399/258, 270, 274, 302, 329, 405, 53, 66, 399/67, 71, 90, 98; 358/1.13, 498, 1.12, 358/471, 474
See application file for complete search history.

(56) References Cited

U.S. PATENT DOCUMENTS 4,787,616 A * 11/1988 Sasaki et al. ................. 271/3.03
5,594,486 A * 1/1997 Kiyohara ..................... 347/104

(Continued)

FOREIGN PATENT DOCUMENTS

| JP | 2005335915 A | 12/2005 |
|---|---|---|
| JP | 2007217179 A | 8/2007 |
| JP | 2012101941 A | 5/2012 |

*Primary Examiner* — Negussie Worku
(74) *Attorney, Agent, or Firm* — Oliff PLC

(57) ABSTRACT

The invention is directed to a conveyance device including: a pair of conveyance members; a connection member as defined herein; an operating member as defined herein; a to-be-stopped member as defined herein; a stopping member as defined herein; and a contact/separation control unit, and a document conveyance device including: a document loading portion in which documents are loaded; a document discharge portion to which the documents are discharged; a discharge member that is disposed on a downstream side of a document reading position in a document conveyance direction and that discharges each of the documents; a reversal passage as defined herein; a discharge member control unit as defined herein; and a transmission system as defined herein.

20 Claims, 23 Drawing Sheets

(51) Int. Cl.
  *B65H 15/00* (2006.01)
  *B65H 29/58* (2006.01)
  *B65H 43/08* (2006.01)
  *H04N 1/00* (2006.01)

(56) References Cited

U.S. PATENT DOCUMENTS

| | | | |
|---|---|---|---|
| 5,655,206 A * | 8/1997 | Miyazawa | 399/361 |
| 5,680,203 A * | 10/1997 | Kobayashi et al. | 355/76 |
| 5,895,038 A * | 4/1999 | Takashima | 271/114 |
| 7,530,568 B2 | 5/2009 | Uchida et al. | |
| 8,870,182 B2 | 10/2014 | Ogata et al. | |
| 2001/0054787 A1 * | 12/2001 | Yamagishi | 271/3.17 |
| 2005/0263956 A1 | 12/2005 | Uchida et al. | |
| 2011/0024979 A1 * | 2/2011 | Matsui | 271/264 |
| 2013/0078528 A1 * | 3/2013 | Swift | 429/320 |
| 2013/0147107 A1 * | 6/2013 | Hanamoto | 271/10.01 |
| 2013/0181394 A1 | 7/2013 | Ogata et al. | |
| 2013/0187330 A1 * | 7/2013 | Kuroda et al. | 271/225 |
| 2015/0084264 A1 * | 3/2015 | Hino | 271/3.18 |

\* cited by examiner

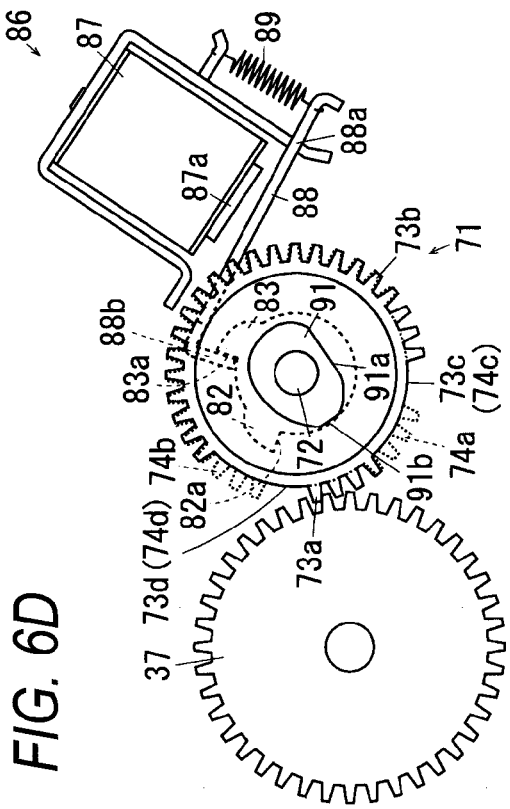
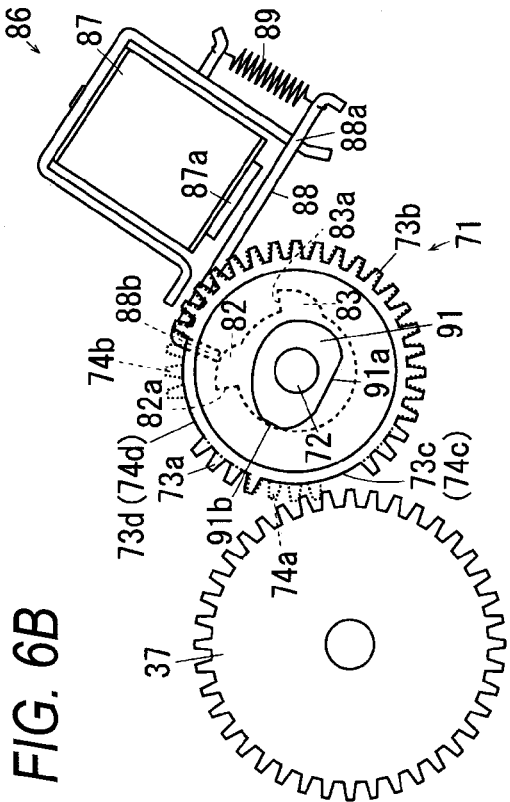
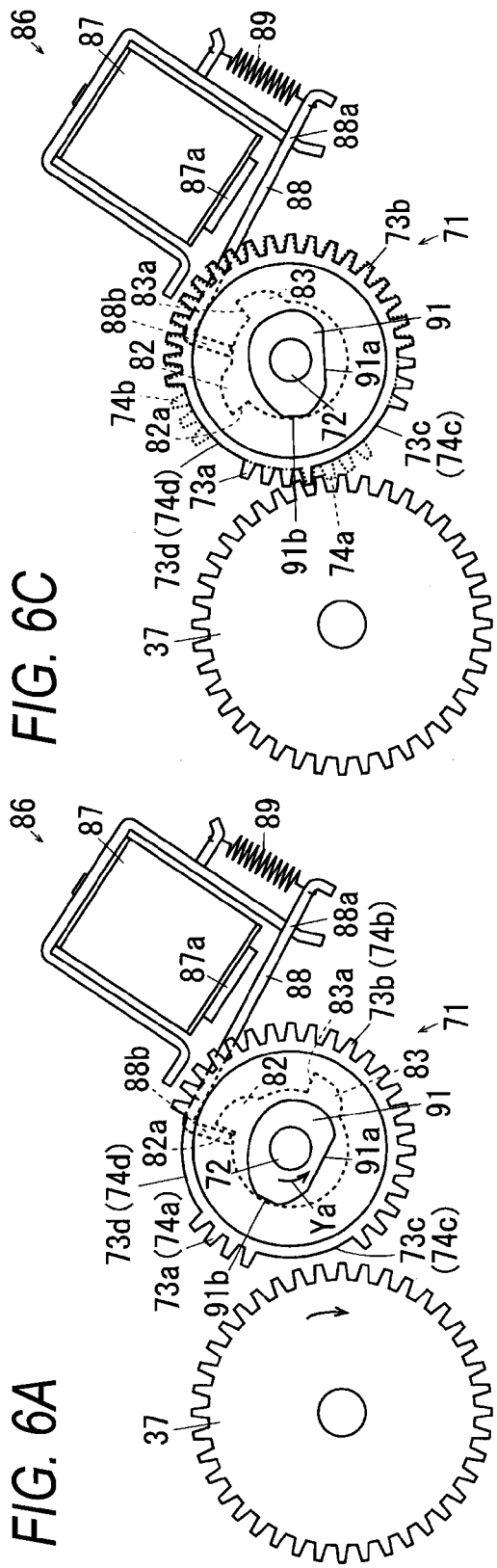

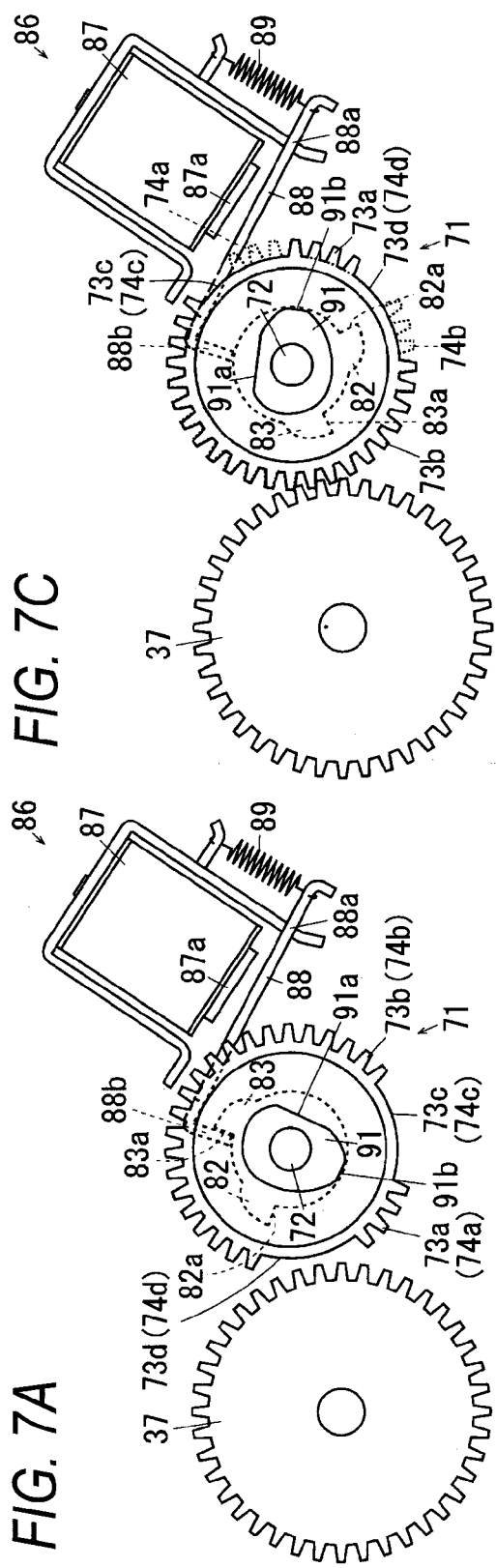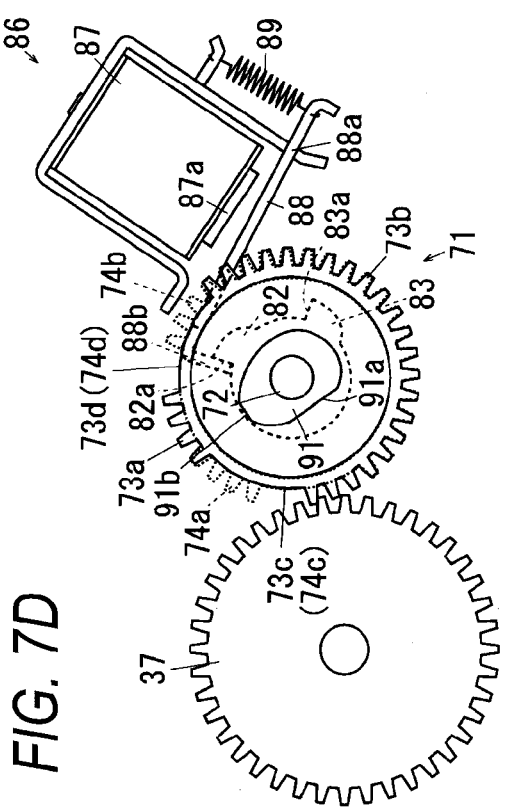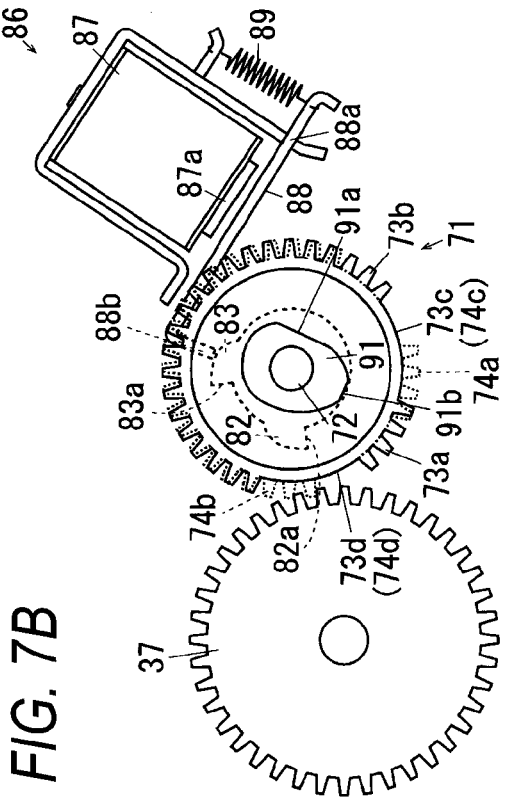

(CONT.)

(FIG. 8 CONTINUED)
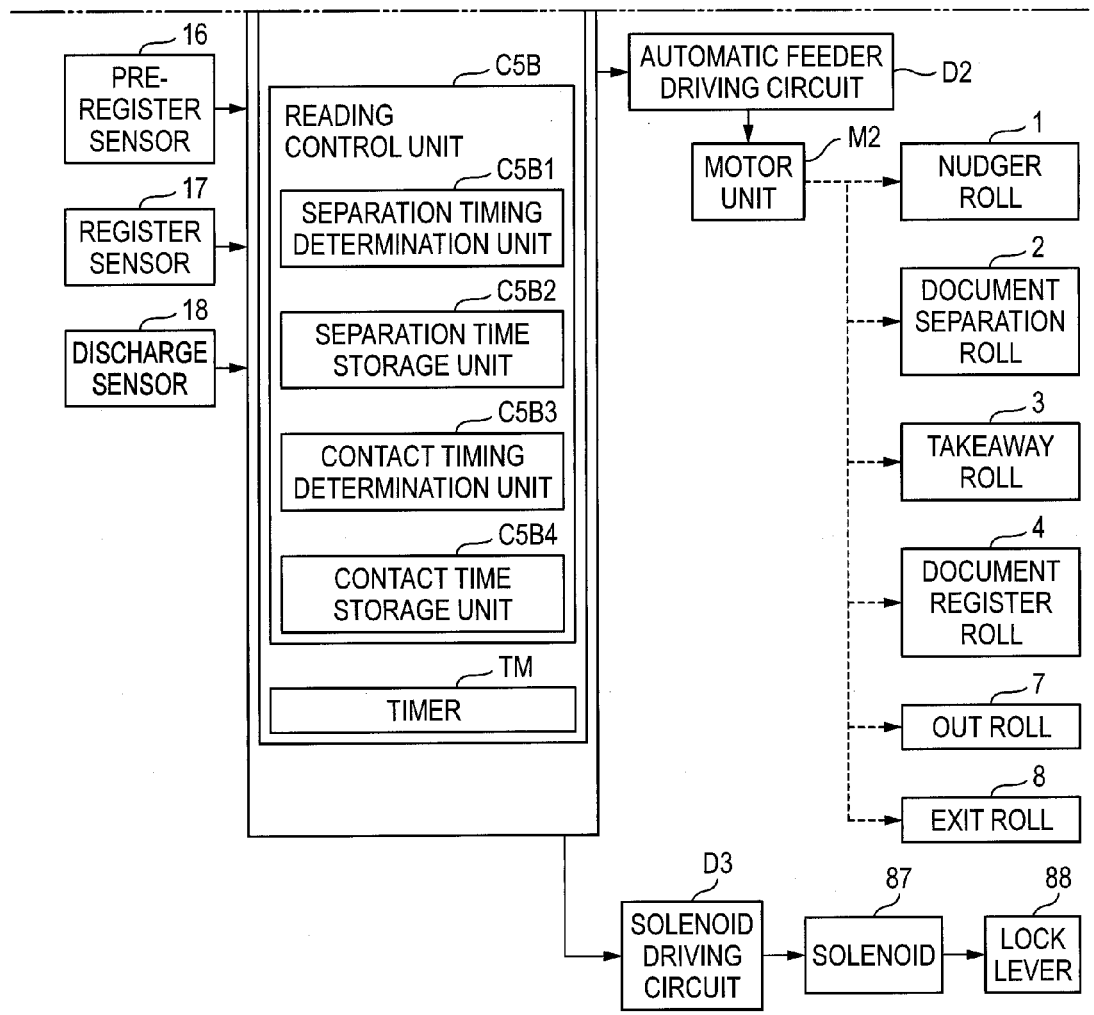

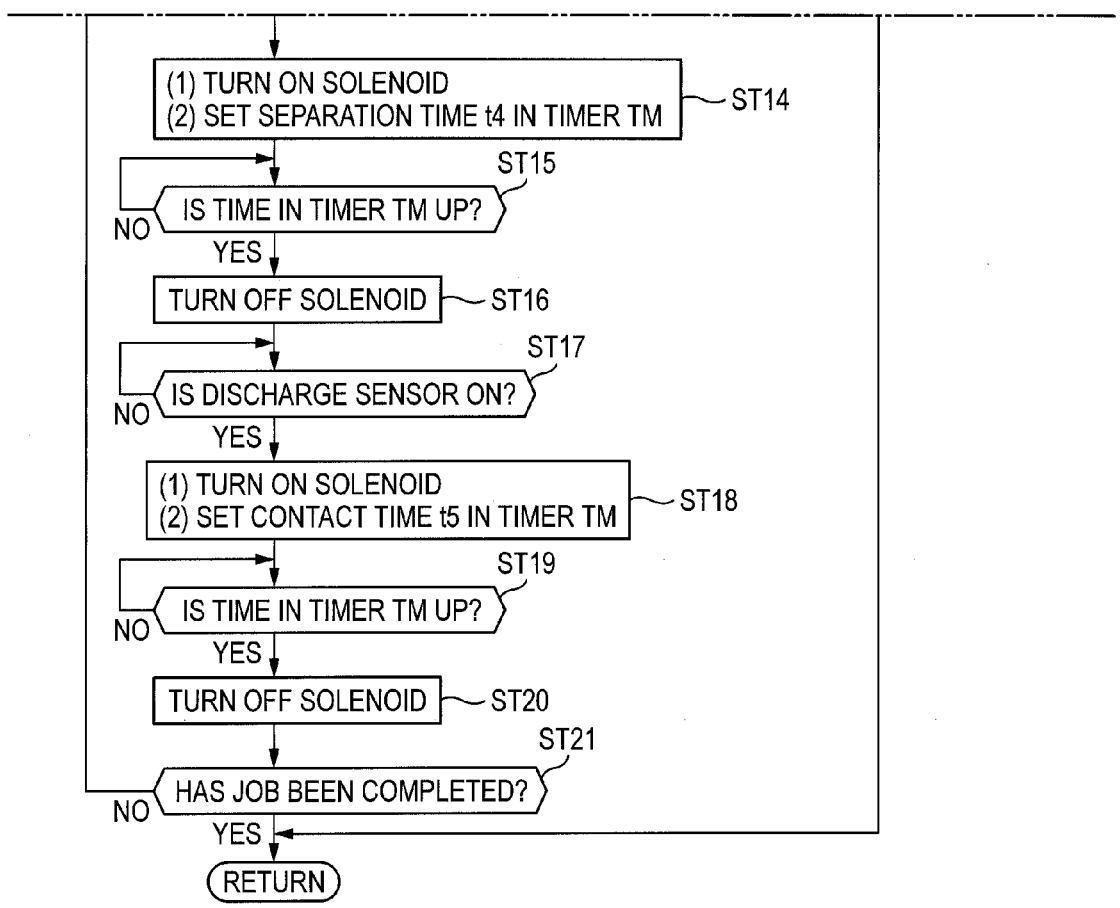

(CONT.)

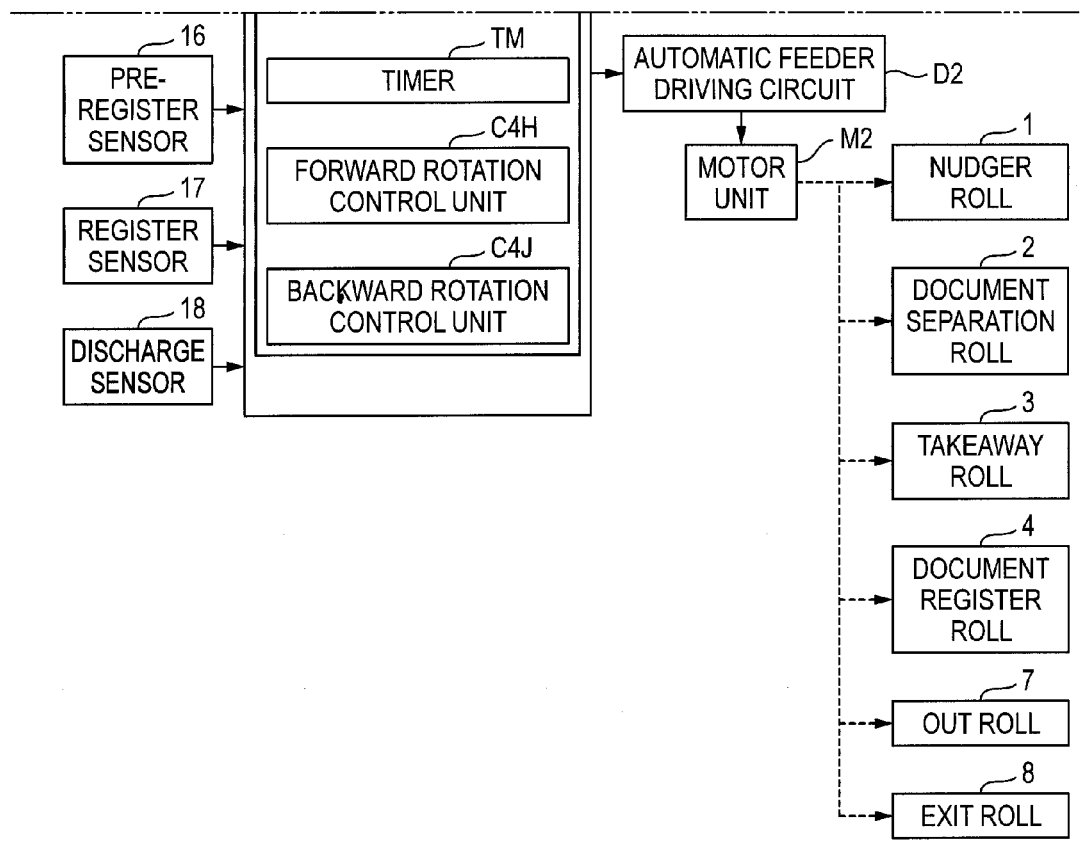

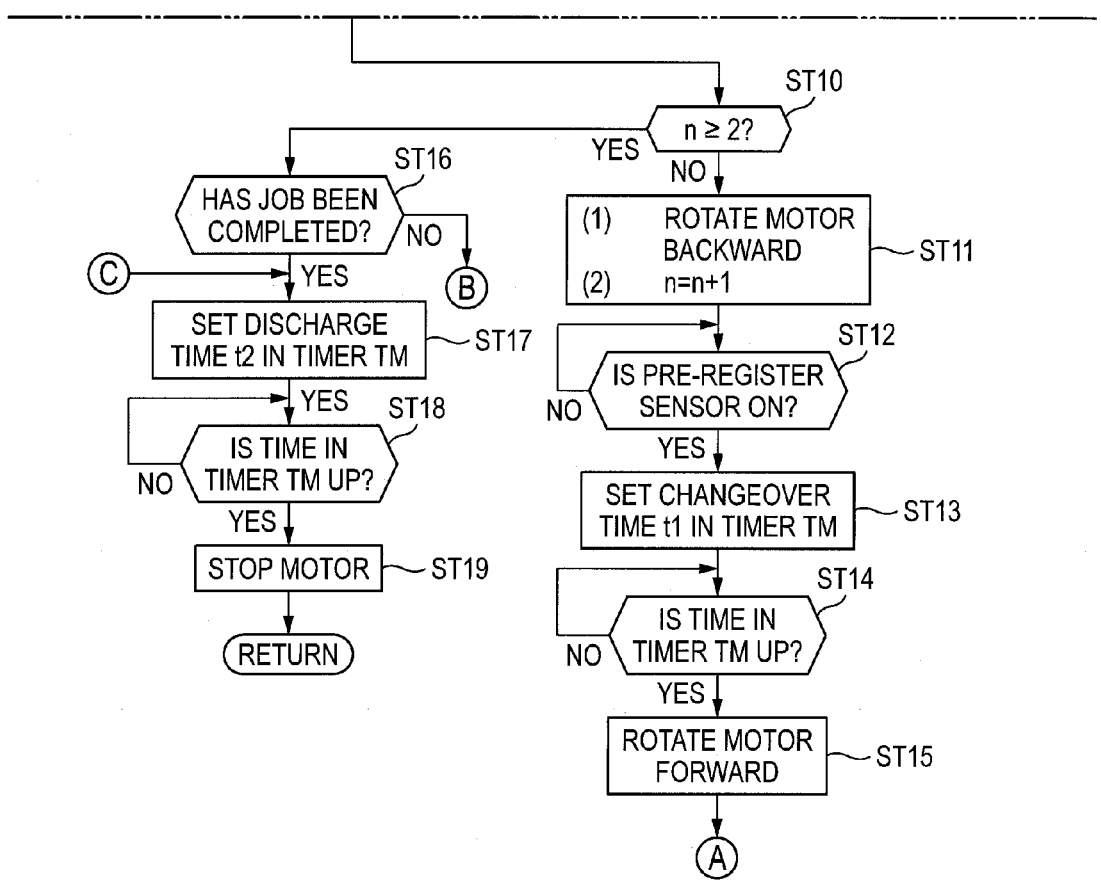

(CONT.)

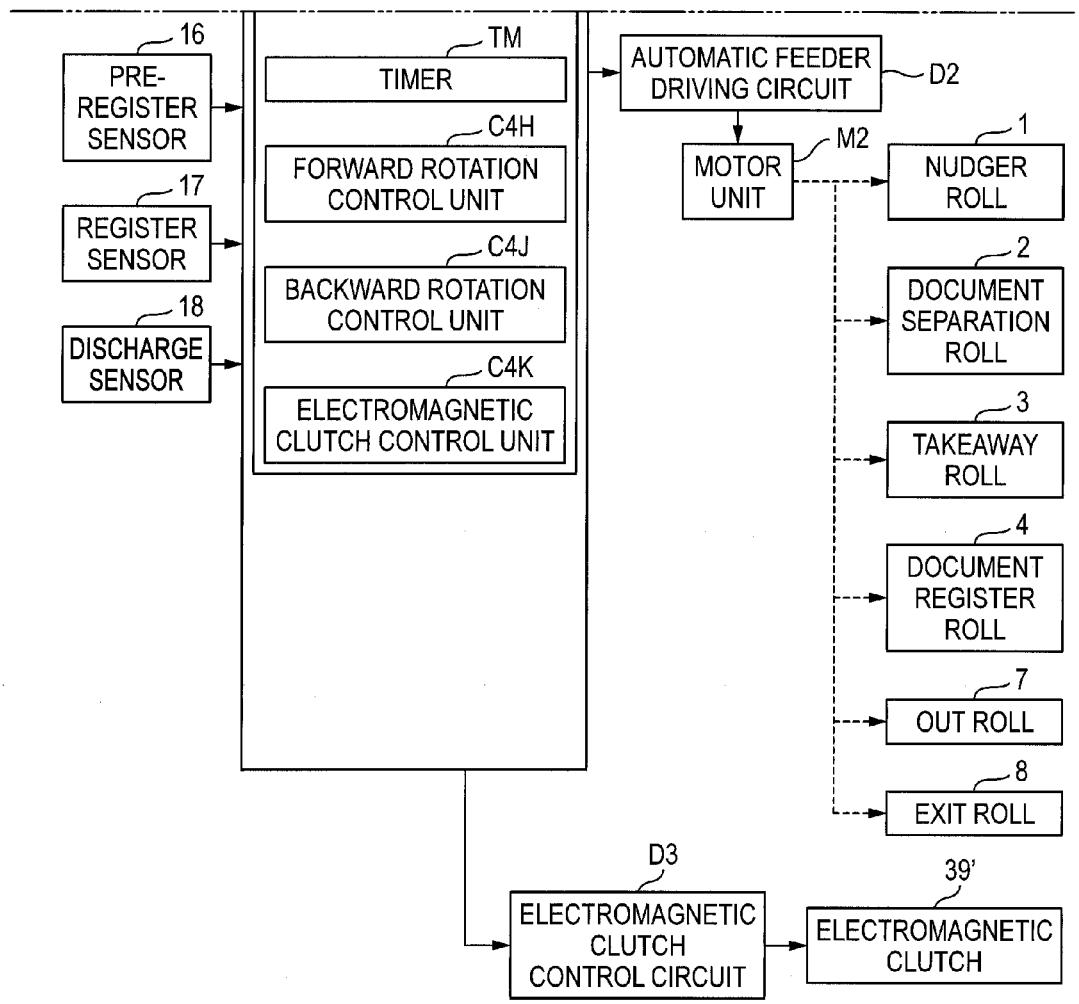

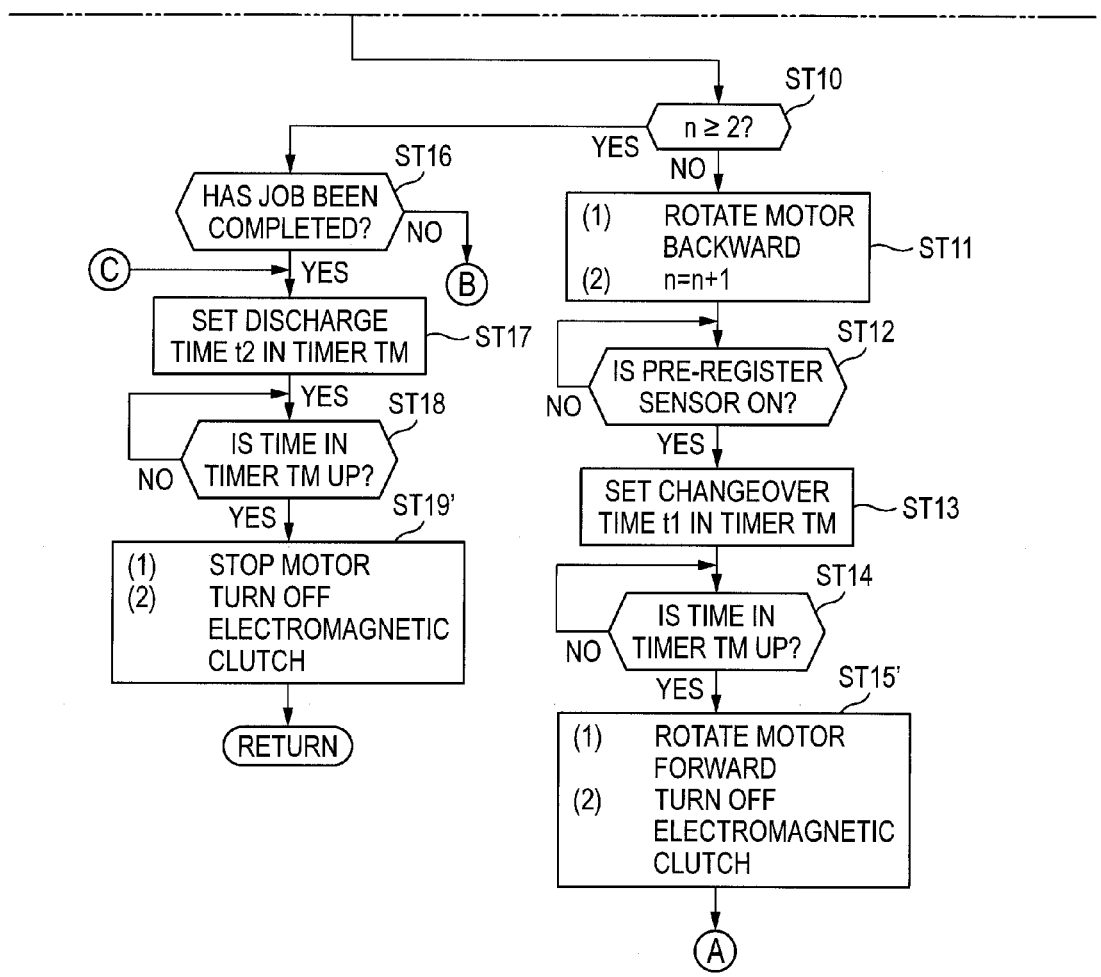
(FIG. 17 CONTINUED)

CONVEYANCE DEVICE, IMAGE READING DEVICE AND IMAGE FORMING APPARATUS

CROSS-REFERENCE TO RELATED APPLICATIONS

This application is based on and claims priority under 35 USC 119 from Japanese Patent Application No. 2014-191700 filed on Sep. 19, 2014 and Japanese Patent Application No. 2014-191702 filed on Sep. 19, 2014.

BACKGROUND

Technical Field

The present invention relates to a conveyance device, an image reading device and an image forming apparatus.

SUMMARY

According to an aspect of the invention, there is provided a conveyance device including: a pair of conveyance members; a connection member that is connected to one of the pair of conveyance members to move the one of the conveyance members relatively to the other in such a direction that the pair of conveyance members are contacted with each other or separated from each other; an operating member that is supported rotatably around a rotation shaft and that has a first engagement portion and a second engagement portion, the first engagement portion being able to be engaged with the connection member so as to bring the pair of conveyance members into contact with each other, the second engagement portion being arranged in a position where a phase of the second engagement portion is shifted from a phase of the first engagement portion by less than 180 degrees in a circumferential direction of the operating member, the second engagement portion being able to be engaged with the connection member so as to separate the pair of conveyance members from each other; a to-be-stopped member that is supported rotatably in conjunction with the operating member and that has a first to-be-stopped portion disposed correspondingly to the first engagement portion and a second to-be-stopped portion disposed correspondingly to the second engagement portion; a stopping member that can be engaged with each of the to-be-stopped portions to thereby stop rotation of the to-be-stopped member and that can be moved between an engagement position where the stopping member is engaged with each of the to-be-stopped portions to retain the position of the operating member and a release position where the stopping member is released from the engagement with each of the to-be-stopped portions; and a contact/separation control unit that controls the stopping member to thereby control contact/separation between the pair of conveyance members, and that moves the stopping member to the engagement position and rotates the operating member by a first rotation amount from the second engagement portion to the first engagement portion in a rotation direction, then moves the stopping member to the release position and rotates the operating member by a second rotation amount that is set in advance to be larger than a rotation amount from the first engagement portion to the second engagement portion, and then moves the stopping member to the engagement position and rotates the operating member by a third rotation amount that is obtained by subtracting the second rotation amount from a rotation amount corresponding to one turn.

BRIEF DESCRIPTION OF THE DRAWINGS

FIGS. 6A, 6B, 6C and 6D are explanatory views of motion of the lifting gear in Example 1, FIG. 6A being an explanatory view of an initial position, FIG. 6B being an explanatory view in which a solenoid turns ON in the state shown in FIG. 6A, FIG. 6C being an explanatory view in which the lifting gear rotates in the state shown in FIG. 6B so as to turn OFF the solenoid, FIG. 6D being an explanatory view of a state in which the lifting gear rotates in the state shown in FIG. 6C so as to bring a lock lever into contact with a second lock nail.

FIGS. 7A, 7B, 7C and 7D are explanatory views of the motion of the lifting gear following FIG. 6D, FIG. 7A being an explanatory view of a state in which the lifting gear rotates in the state shown in FIG. 6D so as to separate a driven roll from a driving roll, FIG. 7B being an explanatory view in which the solenoid turns ON in the state shown in FIG. 7A, FIG. 7C being an explanatory view in which the lifting gear rotates in the state shown in FIG. 7B so as to turn OFF the solenoid, FIG. 7D being an explanatory view of a state in which the lifting gear rotates in the state shown in FIG. 7C so as to bring the lock lever into contact with a first lock nail.

REFERENCE SIGNS LIST

Figure 1:
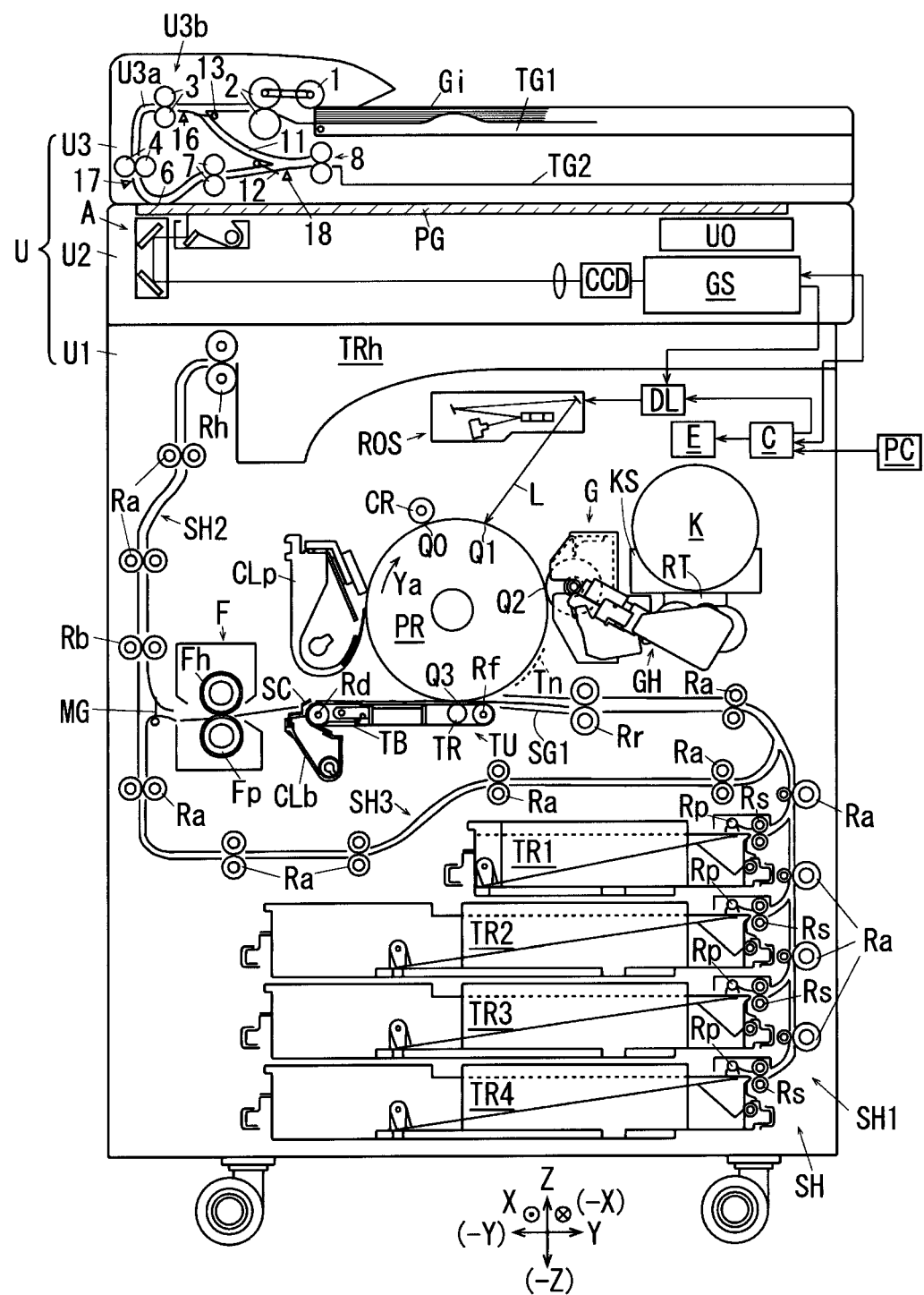
FIG. 1 is an explanatory view of an image forming apparatus according to Examples 1 to 3 of the invention.

8 . . . conveyance member
21 . . . driving member
22 . . . driven member
27 to 29 . . . connection member
31 to 79 . . . driving transmission system
37 . . . first gear member
71 . . . second gear member
73a, 74a . . . first gear portion
73b, 74b . . . second gear portion
73c, 73d, 74c, 74d . . . gap
79 . . . rotation force imparting member
81 . . . to-be-stopped member
82 . . . first to-be-stopped portion
83 . . . second to-be-stopped portion
86 . . . stopping member
91 . . . operating member
91a . . . first engagement member
91b . . . second engagement member
C5 . . . contact/separation control unit
CCD . . . image sensing member
Gi . . . document
M2 . . . driving source
S . . . medium
TG1 . . . document loading portion
TG2 . . . document discharge portion
U . . . image forming apparatus
U1 . . . image recording device
U2 . . . image reading device
U3 . . . conveyance device
3 . . . conveyance member
6 . . . reading position
11 . . . reversal passage
23 . . . pressing member
31 to 69 . . . transmission system
39 . . . cutting-off member
39, 39' . . . allowing member
39' . . . changeover member
C4 . . . discharge member control unit
μ1 . . . friction coefficient between document and discharge member
μ2 . . . friction coefficient between adjacent documents

DETAILED DESCRIPTION

Specific examples (hereinafter referred to as Examples) of an exemplary embodiment of the invention will be described below with reference to the drawings. However, the invention is not limited to the following Examples.

Incidentally, in order to make it easy to understand the following description, a front/rear direction is expressed as an X-axis direction, a left/right direction is expressed as a Y-axis direction, an up/down direction is expressed as a Z-axis direction, and directions or sides designated by arrows X, −X, Y, −Y, Z and −Z indicate front, rear, right, left, up and down directions or front, rear, right, left, upper and lower sides in the drawings.

In addition, in each of the drawings, "○" internally marked with "•" means an arrow indicating a direction from the back of the paper of the drawing toward the front thereof, and "○" internally marked with "x" means an arrow indicating a direction from the front of the paper of the drawing toward the back thereof.

Incidentally, in the following description using the drawings, illustration of members other than necessary members for the description will be omitted suitably in order to make it easy to understand.

EXAMPLE 1

FIG. 1 is an explanatory view of an image forming apparatus according to Example 1 of the invention.

In FIG. 1, a copying machine U as an example of the image forming apparatus according to Example 1 has a printer portion U1 as an example of a recording portion and as an example of an image recording device. A scanner portion U2 as an example of a reading portion and as an example of an image reading device is supported on an upper portion of the printer portion U1. An automatic feeder U3 as an example of a document conveyance device is supported on an upper portion of the scanner portion U2. A user interface U0 as an example of an input portion is supported in the scanner portion U2 in Example 1. Through the user interface U0, an operator can make an input to operate the copying machine U.

A document tray TG1 as an example of a medium storage container is disposed in an upper portion of the automatic feeder U3. A plurality of documents Gi to be copied can be stacked and stored in the document tray TG1. A document discharge tray TG2 as an example of a document discharge portion is formed under the document tray TG1. Document conveyance rolls U3b are disposed along a document conveyance passage U3a between the document tray TG1 and the document discharge tray TG2.

A platen glass PG as an example of a transparent document mounting table is disposed in an upper surface of the scanner portion U2. A reading optical system A is disposed under the platen glass PG in the scanner portion U2 in Example 1. The reading optical system A in Example 1 is supported movably in the left/right direction along a lower surface of the platen glass PG. Incidentally, the reading optical system A is stopped in an initial position shown in FIG. 1 in a normal time.

An image sensor CCD as an example of an image sensing member is disposed on the right of the reading optical system A. An image processing portion GS is electrically connected to the image sensor CCD.

The image processing portion GS is electrically connected to a writing circuit DL of the printer portion U1. The writing circuit DL is electrically connected to an exposure device ROS as an example of a latent image forming device.

A photosensitive drum PR as an example of an image retainer is disposed in the printer portion U1. A charging roll CR as an example of a charging member, a development device G, a transfer unit TU as an example of a transfer device, and a drum cleaner CLp as an example of a cleaner are disposed around the photosensitive drum PR.

A cartridge K as an example of a developing agent storage container is disposed on the right of the development device G. A cartridge holder KS supporting the cartridge K and the development device G are connected to each other through a developing agent conveyance device GH having a reserve tank RT.

Paper feed trays TR1 to TR4 as an example of medium storage containers are disposed under the transfer unit TU. A conveyance passage SH1 extends from each of the paper feed trays TR1 to TR4. Pickup rolls Rp as an example of medium extraction members, separation rolls Rs as an example of separation members, conveyance rolls Ra as an example of conveyance members, and a register roll Rr as an example of a delivery member are disposed in the conveyance passage SH1.

A fixation device F having a heating roll Fh and a pressure roll Fp is disposed on the left of the transfer unit TU. The fixation device F is connected to a paper discharge tray TRh through a discharge passage SH2. The discharge passage SH2 and the register roll Rr are connected to each other through a reversal passage SH3. A conveyance roll Rb and a discharge roll Rh both of which can rotate forward and backward are disposed in the discharge passage SH2.

(Description about Image Forming Operation)

A plurality of documents Gi stored in the document tray TG1 pass through a document reading position on the platen glass PG sequentially and are then discharged to the document discharge tray TG2.

When documents are automatically conveyed by the automatic feeder U3 to be copied, each of the documents Gi passing through the reading position on the platen glass PG sequentially is exposed to light in the state in which the reading optical system A is stopped in the initial position.

When an operator manually places each document Gi on the platen glass PG to make a copy, the reading optical system A moves in the right/left direction so that the document on the platen glass PG can be scanned while being exposed to light.

Reflected light from the document Gi passes through the reading optical system A and is then condensed on the image sensor CCD. The image sensor CCD converts the reflected light of the document condensed on an image sensing surface into an electric signal.

The image processing portion GS converts a reading signal received from the image sensor CCD into a digital image signal, and outputs the converted digital image signal to the writing circuit DL of the printer portion U1. The writing circuit DL outputs a control signal corresponding to the inputted image writing signal to the exposure device ROS.

The exposure device ROS outputs a laser beam L to form a latent image on the surface of the photosensitive drum PR electrostatically charged by the charging roll CR. The latent image on the surface of the photosensitive drum PR is developed into a visible image by the development device G. A transfer roll TR of the transfer unit TU transfers the visible image on the surface of the photosensitive drum PR onto a recording sheet S as an example of a medium which has been conveyed through the conveyance passage SH1. The visible image which has been transferred on the recording sheet S is fixed by the fixation device F. The recording sheet S which has passed through the fixation device F is conveyed to the reversal passage SH3 for double-side printing. Otherwise, the recording sheet S is discharged to the paper discharge tray TRh by the discharge roll Rh.

(Description about Automatic Feeder U3)

Figure 2:
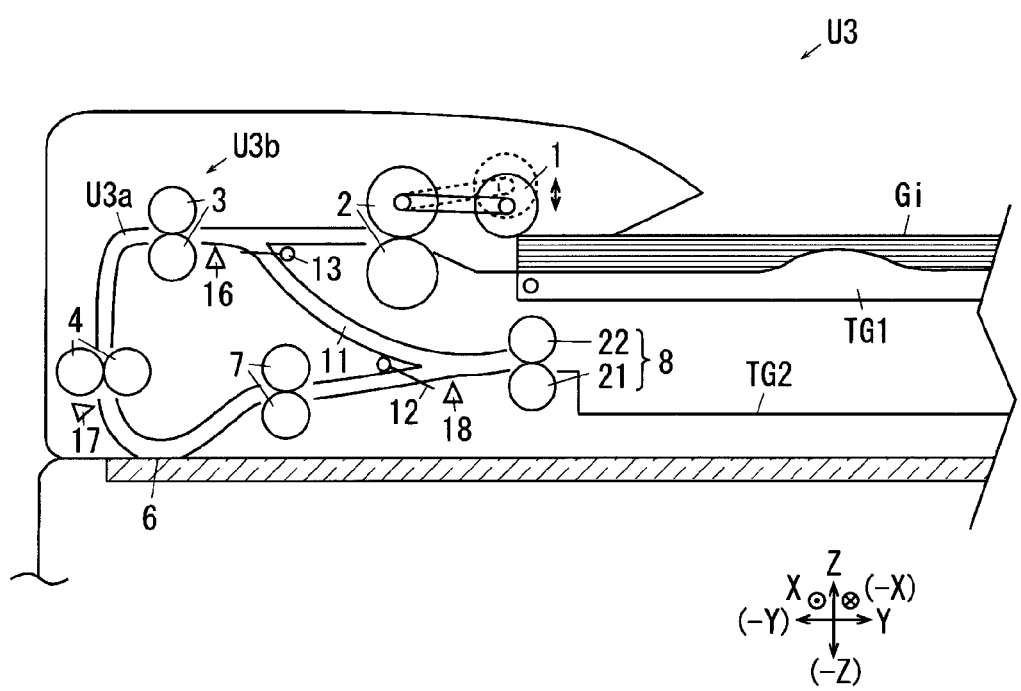
FIG. 2 is an enlarged explanatory view of a main part of a document conveyance device according to Examples 1 to 3.

FIG. 2 is an enlarged explanatory view of a main part of the document conveyance device according to Example 1.

In FIG. 1 and FIG. 2, the C-shaped document conveyance passage U3a is formed between the document tray TG1 and the document discharge tray TG2 in the automatic feeder U3 serving as an example of the document conveyance device according to Example 1.

A nudger roll 1 as an example of a document extraction member is disposed in an upper right portion of the document conveyance passage U3a in Example 1, that is, in an upstream end portion in a document Gi conveyance direction. Document separation rolls 2 as an example of document separation members are disposed on the left of the nudger roll 1.

Takeaway rolls 3 as an example of document conveyance members are disposed on a downstream side of the document separation rolls 2 in the document Gi conveyance direction. Document register rolls 4 as an example of document delivery timing adjustment members are disposed on a downstream side of the takeaway rolls 3 in the document Gi conveyance direction.

An image reading position 6 at which an image is read is set on the platen glass PG on a downstream side of the document register rolls 4 in the document Gi conveyance direction.

Out rolls 7 as an example of document conveyance members are disposed on a downstream side of the image reading position 6 in the document Gi conveyance direction. The image reading position 6 serves as an example of a document reading position.

An exit roll 8 as an example of a document conveyance member and as an example of a document discharge member is disposed on a downstream side of the out rolls 7 in the document Gi conveyance direction.

A document reversal passage 11 is formed between an upstream side of the exit roll 8 and an upstream side of the takeaway rolls 3 in the document Gi conveyance direction.

A gate 12 as an example of a conveyance changeover portion is disposed in a branching portion between the document reversal passage 11 and the document conveyance passage U3a on the upstream side of the exit roll 8. In addition, a gate 13 as an example of a conveyance changeover member is disposed in a merging portion between the document reversal passage 11 and the conveyance passage U3a on the upstream side of the takeaway rolls 3.

A pre-register sensor 16 as an example of a medium detection member is disposed in the upstream vicinity of the takeaway rolls 3 in the document conveyance passage U3a in Example 1. In addition, a register sensor 17 as an example of a medium detection member is disposed in the downstream vicinity of the document register rolls 4. Further, a discharge sensor 18 as an example of a medium detection member is disposed on the upstream side of the exit roll 8.

(Description about Transmission System of Document Conveyance Device)

Figure 3A:
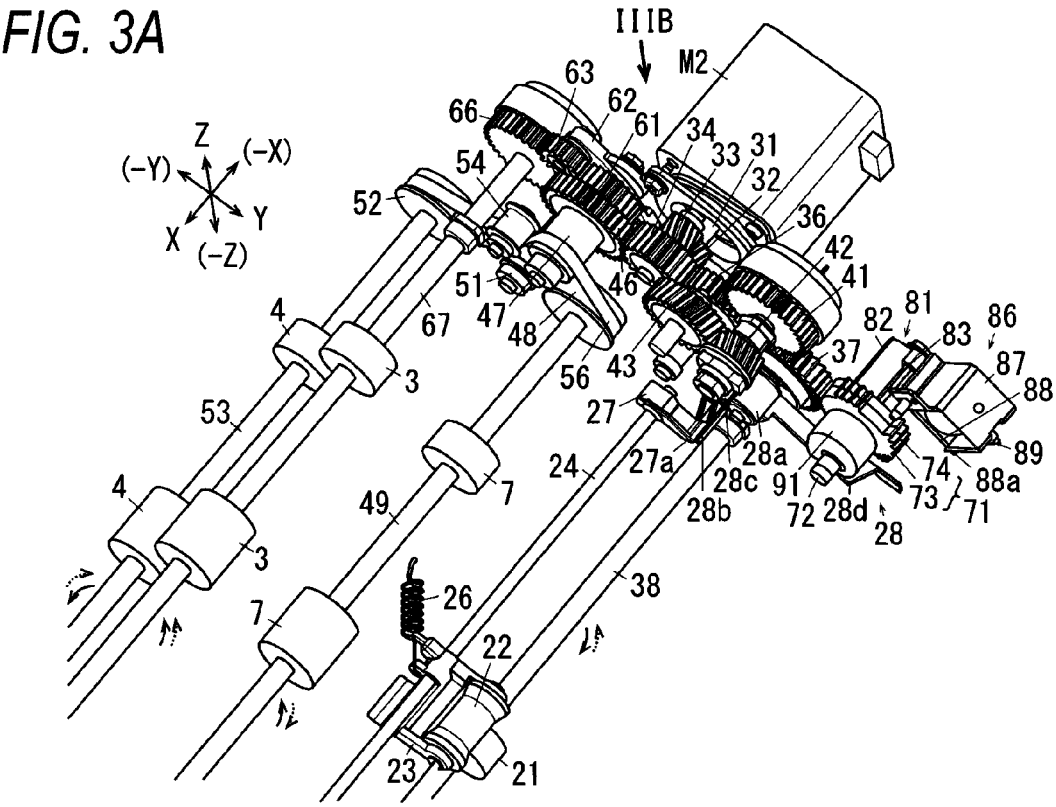
FIGS. 3A and 3B are explanatory views of a transmission system of the document conveyance device according to Example 1, FIG. 3A being a perspective view, FIG. 3B being a view seen from the direction of an arrow IIIB of FIG. 3A.
Figure 3B:
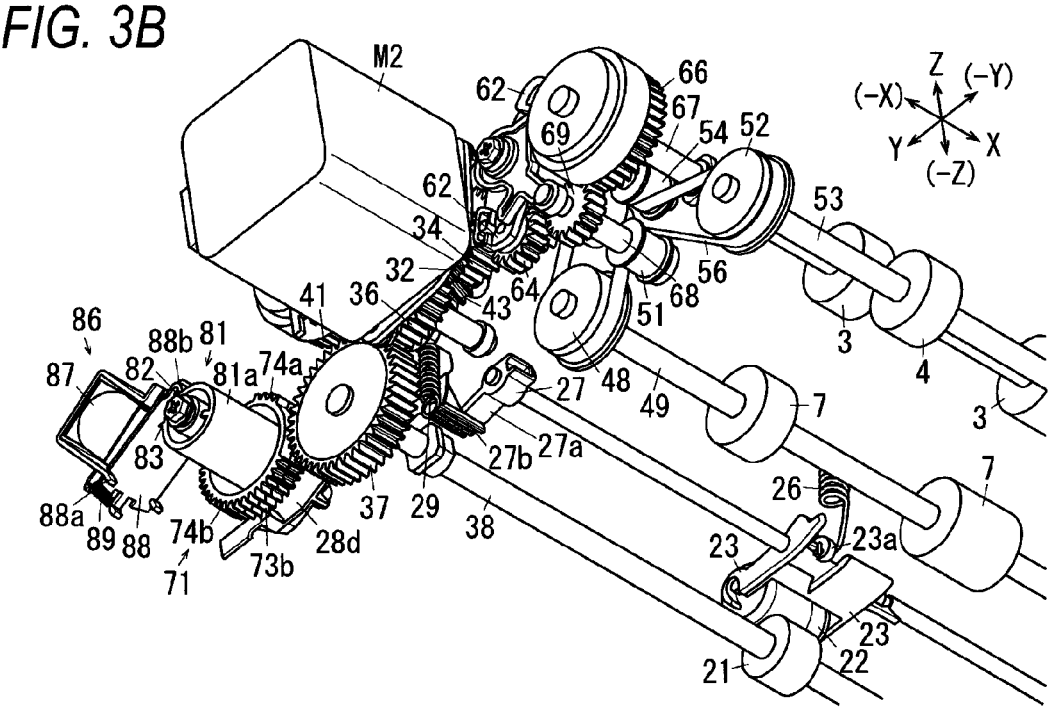

FIGS. 3A and 3B are explanatory views of a transmission system of the document conveyance device according to Example 1. FIG. 3A is a perspective view. FIG. 3B is a view seen from the direction of an arrow IIIB of FIG. 3A.

In FIGS. 3A and 3B, the exit roll 8 in Example 1 has a driving roll 21 as an example of a driving member disposed on the lower side. A driven roll 22 as an example of a driven member is disposed above the driving roll 21. A shaft of the driven roll 22 is supported rotatably on a distal end of an arm 23 serving as an example of a support member. A base end of the arm 23 is supported rotatably on a support shaft 24 extending in the front/rear direction. A pressing support portion 23a is formed in a base end portion of the arm 23. One end of a coil spring 26 as an example of a pressing member is supported on the pressing support portion 23a. The coil spring 26 urges the pressing support portion 23a upward. Accordingly, the driven roll 22 is pressed against the driving roll 21 by the force of the coil spring 26.

Incidentally, the material of the driving roll 21 in Example 1 is selected and high friction treatment is applied to the surface of the driving roll 21 so that a friction coefficient $\mu1$ between the driving roll 21 and each of documents Gi and a friction coefficient $\mu2$ between adjacent ones of the documents Gi satisfy the relation μ1>μ2. That is, the driving roll 21 is formed to satisfy the relation μ1>μ2 even for the documents Gi which have the largest friction coefficient μ2 among paper kinds of documents Gi which can be used by the automatic feeder 3. Accordingly, even when a document Gi reaching the exit roll 8 is so long in length in the conveyance direction that a rear portion of the document Gi is conveyed to the reversal passage 11 while a front portion of the document Gi is conveyed toward the document discharge tray TG2, the front portion can be conveyed toward the document discharge tray TG2 by the driving roll 21 and the rear portion can be conveyed by the takeaway rolls 3.

A first lever 27 as an example of a first connection member is supported on a rear end of the support shaft 24. The first lever 27 is supported rotatably and integrally with the support shaft 24. The first lever 27 has a to-be-lifted-up portion 27*a* which extends rightward.

A second lever 28 is supported on the right of the first lever 27. The second lever 28 is supported on a not-shown frame rotatably around a shaft portion 28*a*. A lifting-up portion 28*b* is formed on the left of the shaft portion 28*a*. The lifting-up portion 28*b* extends toward the to-be-lifted-up portion 27*a* of the first lever 27. The lifting-up portion 28*b* is configured so that an upper surface of the lifting-up portion 28*b* can make contact with a lower surface of the to-be-lifted-up portion 27*a*.

A to-be-urged portion 28*c* which extends leftward is formed in the rear of the lifting-up portion 28*b*. One end of a coil spring 29 as an example of an urging member is connected to a left end of the to-be-urged portion 28*c*. The other end of the coil spring 29 is supported on the not-shown frame. The coil spring 29 applies a force to pull the to-be-urged portion 28*c* downward. In addition, the second lever 28 has a cam contact portion 28*d* which serves as an example of an operating member contact portion and which extends right downward from the shaft portion 28*a*.

A connection member 27 to 29 in Example 1 is constituted by the first lever 27, the second lever 28 and the coil spring 29.

A motor unit M2 as an example of a driving source is supported on a rear portion of the automatic feeder U3. Incidentally, the motor unit M2 in Example 1 is constituted by a motor unit which can rotate forward and backward.

A driving gear 32 as an example of a gear is supported on an output shaft 31 of the motor unit M2. A first intermediate gear 33 as an example of a gear is engaged with the driving gear 32. A second intermediate gear 34 as an example of a gear is supported on the same shaft for the first intermediate gear 33. A third intermediate gear 36 as an example of a gear is engaged with the second intermediate gear 34. An exit gear 37 as an example of a gear is engaged with the third intermediate gear 36. The exit gear 37 is supported on a rear end of a shaft 38 of the driving roll 21 of the exit roll 8.

Incidentally, a fourth intermediate gear 41 as an example of a gear is engaged with the third intermediate gear 36. A fifth intermediate gear 42 as an example of a gear is supported on the same shaft for the fourth intermediate gear 41 through a clutch serving as an example of a driving changeover member. A sixth intermediate gear 43 as an example of a gear is engaged with the fifth intermediate gear 42. A not-shown gear of a shaft of the document separation roll 2 is engaged with the sixth intermediate gear 43. Incidentally, configuration is made so that the driving can be transmitted from the document separation roll 2 to the nudger roll 1 through the not-shown gear.

In addition, a seventh intermediate gear 46 as an example of a gear is engaged with the second intermediate gear 34. A first pulley 47 as an example of a rotation transmission member is supported on the same shaft for the seventh intermediate gear 46 and in front of the seventh intermediate gear 46. A second pulley 48 as an example of a rotation transmission member is supported under the first pulley 47. The second pulley 48 is supported on a driving shaft 49 of the out rolls 7.

A third pulley 51 as an example of a rotation transmission member is disposed on the left of the second pulley 48. A fourth pulley 52 as an example of a rotation transmission member is disposed on the left of the third pulley 51. The fourth pulley 52 is supported on a driving shaft 53 of the document register rolls 4.

A fifth pulley 54 as an example of a rotation transmission member is disposed on an upper right side of the fourth pulley 52. A transmission belt 56 as an example of a rotation transmission member is laid around the respective pulleys 47 to 54.

An eighth intermediate gear 61 as an example of a gear is supported on the same shaft for the seventh intermediate gear 46 and in the rear of the seventh intermediate gear 46. A swing arm 62 as an example of a changeover member is supported on the shaft of the seventh intermediate gear 46, the first pulley 47 and the eighth intermediate gear 61. A center portion of the swing arm 62 is supported rotatably on the shaft of the seventh intermediate gear 46 etc.

A ninth intermediate gear 63 as an example of a gear is supported on an upper portion of the swing arm 62. In addition, a tenth intermediate gear 64 as an example of a gear is supported on a lower portion of the swing arm 62. Both the ninth intermediate gear 63 and the tenth intermediate gear 64 are engaged with the eighth intermediate gear 61.

An eleventh intermediate gear 66 as an example of a gear is disposed on the left of the eighth intermediate gear 61. The eleventh intermediate gear 66 is supported on a shaft 67 of the takeaway rolls 3.

In FIG. 3B, a twelfth intermediate gear 69 as an example of a gear is supported rotatably on a rear portion of a shaft 68 of the third pulley 51. The twelfth intermediate gear 69 is engaged with the eleventh intermediate gear 66.

When the motor unit M2 is driven and rotated forward, the respective gears 32 to 69 are rotated on the swing arm 62 in a direction designated by arrows of solid lines in FIG. 3A. Accordingly, the ninth intermediate gear 63 and the tenth intermediate gear 64 move along the outer circumference of the eighth intermediate gear 61, resulting in a state shown in FIG. 3A and FIG. 3B. Accordingly, the ninth intermediate gear 63 is engaged with the eleventh intermediate gear 66 and the tenth intermediate gear 64 is separated from the twelfth intermediate gear 69.

On the other hand, when the motor unit M2 is driven and rotated backward, the respective gears 32 to 69 are rotated in directions designated by arrows of broken lines in FIG. 3A. Accordingly, the ninth intermediate gear 63 and the tenth intermediate gear 64 move along the outer circumference of the eighth intermediate gear 61. The ninth intermediate gear 63 is separated from the eleventh intermediate gear 66 and the tenth intermediate gear 64 is engaged with the twelfth intermediate gear 69.

(Description about Rotation Transmission to Respective Rolls)

Accordingly, when the motor unit M2 is driven and rotated forward, the forward rotation is transmitted from the driving gear 32 to the exit gear 37 through the intermediate gears 33 to 36 in the driving transmission system 31 to 79 in Example 1. Accordingly, the driving roll 21 of the exit roll 8 rotates in a direction to convey a document Gi toward the document discharge tray TG2. In addition, the rotation is transmitted to the document register rolls 4 and the out rolls 7 through the driving gear 32, the first intermediate gear 33, the second intermediate gear 34, the seventh intermediate gear 46, the pulleys 47 to 54 and the transmission belt 56 so that the document register rolls 4 and the out rolls 7 can rotate in the direction to convey the document Gi toward the downstream side in the conveyance direction.

Further, the rotation is transmitted to the takeaway rolls 3 through the driving gear 32, the first intermediate gear 33, the second intermediate gear 34, the seventh intermediate gear 46, the eighth intermediate gear 61, the ninth intermediate gear 63, and the eleventh intermediate gear 66 so that the takeaway rolls 3 can rotate in the direction to convey the document Gi toward the downstream side in the conveyance direction. In addition, the rotation is transmitted also to the document separation roll 2 or the nudger roll 1 through the driving gear 32 and the intermediate rolls 33 to 36 and 41 to 43 so that the document separation roll 2 or the nudger roll 1 can rotate in the direction to convey the document Gi toward the downstream side in the conveyance direction. Incidentally, the rotation is transmitted to the document separation roll 2 or the nudger roll 1 when the clutch provided in the fourth intermediate gear 41 is connected. The rotation is not transmitted to the document separation roll 2 or the nudger roll 1 when the clutch is disconnected.

In addition, when the motor unit M2 is rotated backward, the driving is transmitted to the driving transmission system 31 to 69 in Example 1 in the same manner as when the motor unit M2 is rotated forward so that the exit roll 8, the document register rolls 4 and the out rolls 7 can rotate backward. On the other hand, the rotation is transmitted to the takeaway rolls 3 through the driving gear 32, the first intermediate gear 33, the second intermediate gear 34, the seventh intermediate gear 46, the eighth intermediate gear 61, the tenth intermediate gear 64, the twelfth intermediate gear 69 and the eleventh intermediate gear 66 so that the takeaway rolls 3 can rotate in the same direction in which the document Gi is conveyed toward the downstream side in the conveyance direction as when the motor unit M2 is rotated forward. That is, the takeaway rolls 3 in Example 1 rotate in the same rotation direction regardless of whether the motor unit M2 is rotated forward or backward. Incidentally, the clutch is disconnected not to transmit the backward rotation to the document separation roll 2 or the nudger roll 1 in Example 1.

(Description about Exit Roll Contact/Separation Mechanism)

Figure 4A:
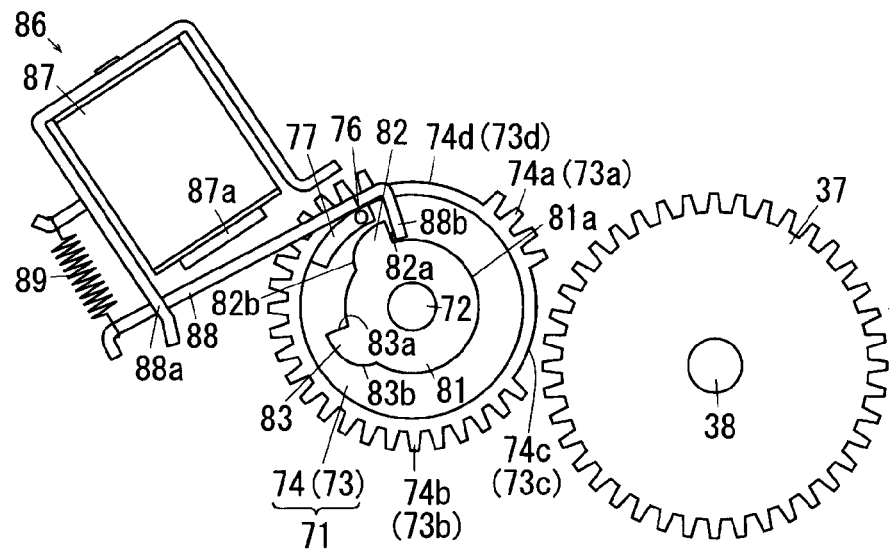
FIGS. 4A and 4B are explanatory views of a contact/separation mechanism in Example 1, FIG. 4A being a view seen from the front, FIG. 4B being a view seen from the rear.
Figure 4B:
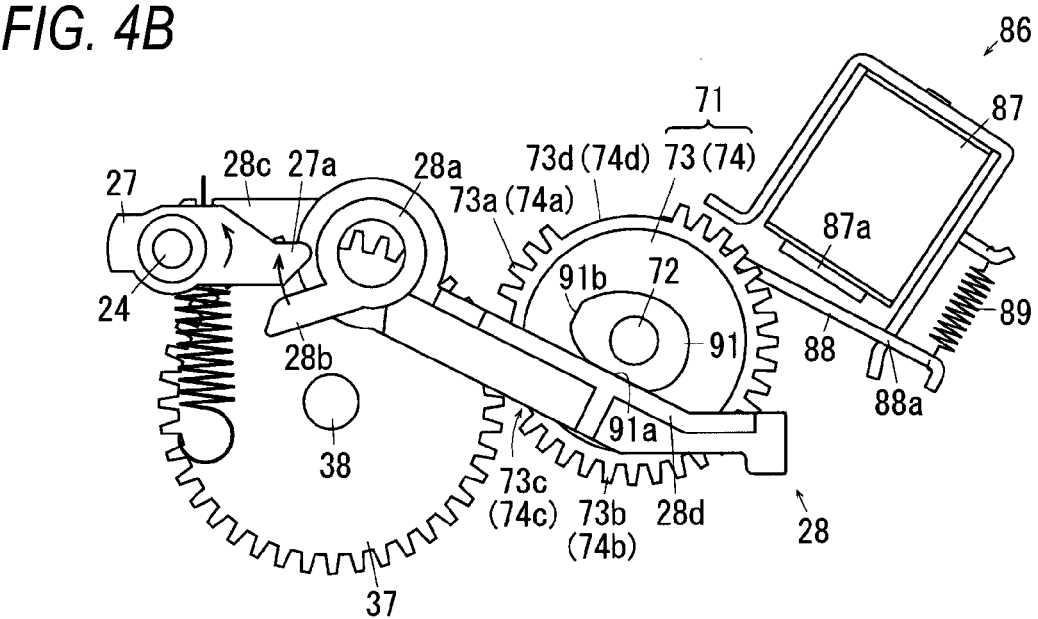

FIGS. 4A and 4B are explanatory views of a contact/separation mechanism in Example 1. FIG. 4A is a view seen from the front. FIG. 4B is a view seen from the rear.

Figure 5:
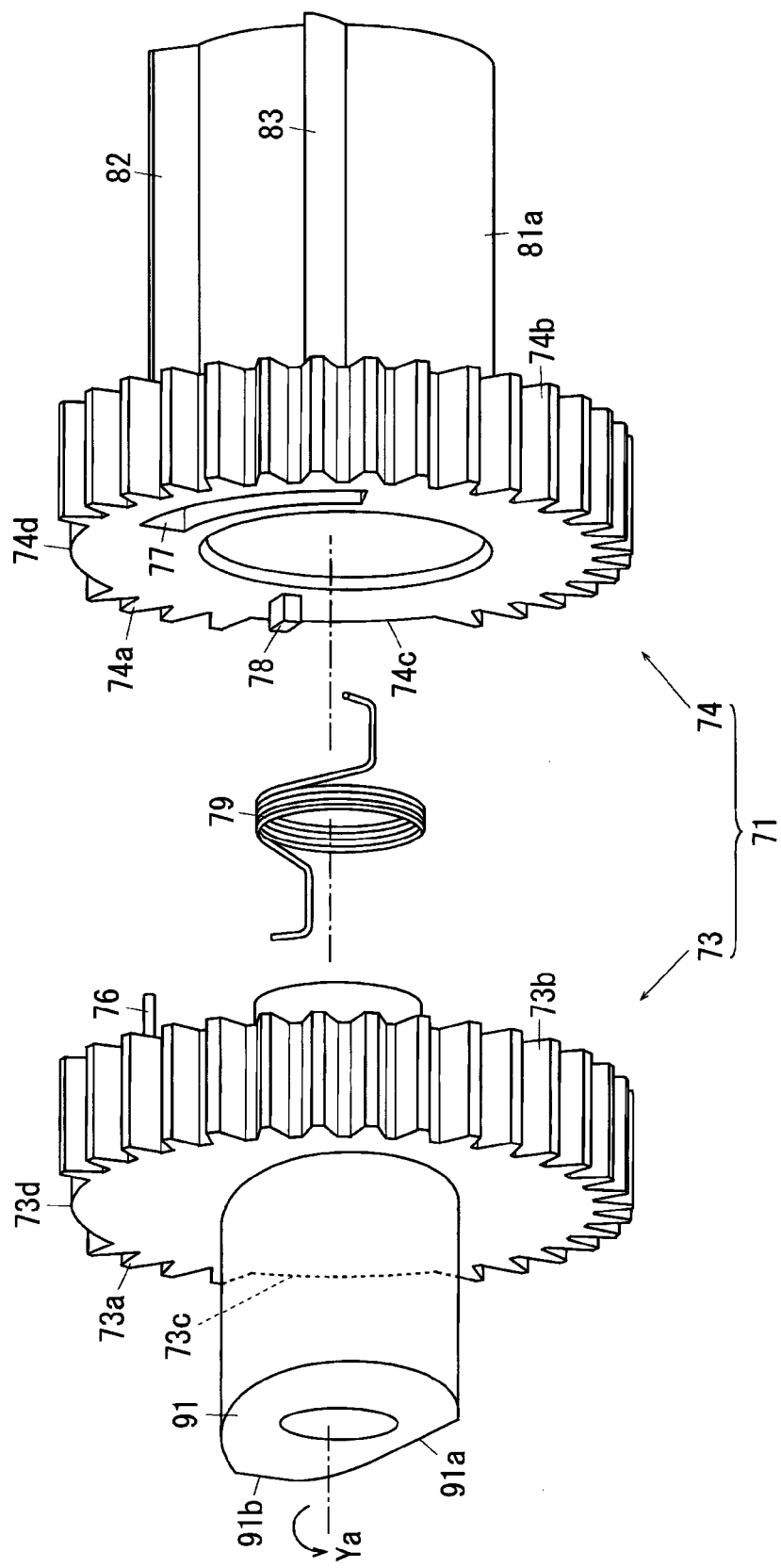
FIG. 5 is an exploded explanatory view of a lifting gear in Example 1.

FIG. 5 is an exploded explanatory view of a lifting gear in Example 1.

In FIGS. 3A and 3B, FIGS. 4A and 4B and FIG. 5, a lifting gear 71 as an example of a second gear member is disposed on the right of the exit gear 37 serving as an example of a first gear member. The lifting gear 71 is supported rotatably on a shaft 72 serving as an example of a shaft. The lifting gear 71 has a cam gear 73 disposed on the front side and a lock gear 74 disposed on the rear side.

Each of the cam gear 73 and the lock gear 74 is formed into a disk shape. A first gear portion 73a or 74a as an example of a first gear portion and a second gear portion 73b or 74b as an example of a second gear portion are provided in the outer circumference of the cam gear 73 or the lock gear 74. The second gear portion 73b or 74b is formed with a circumferential gap from the first gear portion 73a or 74a. Each of the gear portions 73a, 73b, 74a and 74b is configured to be able to transmit rotation when it is engaged with the exit gear 37.

That is, in Example 1, the axial lengths or positions of the cam gear 73 and the lock gear 74 are set so that both the cam gear 73 and the lock gear 74 can be engaged with the exit gear 37.

A first toothless portion 73c or 74c which is a portion having no gear tooth is formed in the gap on a downstream side of the first gear portion 73a or 74a and on an upstream side of the second gear portion 73b or 74b in a rotation direction Ya of the lifting gear 71 during forward rotation of the motor unit M2. Similarly, a second toothless portion 73d or 74d is formed in the gap on a downstream side of the second gear portion 73b or 74b and on an upstream side of the first gear portion 73a or 74a. The circumferential width of each toothless portion 73c, 73d, 74c or 74d is set so that each gear portion 73a, 73b, 74a or 74b can be prevented from making contact with the teeth of the exit gear 37 when the toothless portion 73c, 73d, 74c or 74d faces the exit gear 37. Incidentally, in Example 1, an angle formed between the center of the toothless portion 73c or 74c and the center of the toothless portion 73d or 74d is set at 90 degrees.

In FIG. 4A and FIG. 5, a pin 76 as an example of a to-be-guided member protruding toward the lock gear 74 side is supported on the cam gear 73.

A guide groove 77 as an example of a guiding portion is formed in the lock gear 74 correspondingly to the pin 76. The guide groove 77 is formed into a partial arc shape around the shaft 72. In addition, a spring support portion 78 as an example of an imparting member support portion is formed on a cam gear 73 side surface of the lock gear 74.

A torsion spring 79 as an example of a rotation force imparting member is disposed between the cam gear 73 and the lock gear 74. One end of the torsion spring 79 is supported on the pin 76 and the other end thereof is supported on the spring support portion 78. Accordingly, the torsion spring 79 imparts a force to rotate the lock gear 74 relatively to the cam gear 73 in the rotation direction Ya.

A driving transmission system 31 to 79 in Example 1 is constituted by the respective members referred to by the numerals 31 to 79.

A to-be-locked member 81 as an example of a to-be-stopped member is disposed on a rear surface of the lock gear 74. The to-be-locked member 81 in Example 1 is formed into a columnar shape integral and coaxial with the lock gear 74 so as to protrude from the rear of the lock gear 74. A first lock nail 82 as an example of a first to-be-stopped portion is formed in the to-be-locked member 81. A second lock nail 83 is formed in a position shifted from the first lock nail 82 in the circumferential direction of the to-be-locked member 81. The second lock member 83 is disposed in the position where the circumferential phase of the second lock nail 83 is shifted on the upstream side by 90 degrees, which is an example of an angle less than 180 degrees, from the first lock nail 82 in the rotation direction Ya of the lifting gear 71.

Each of the lock nails 82 and 83 is formed into a nail-like shape protruding radially from an outer circumferential surface 81a of the to-be-locked member 81. The lock nail 82 or 83 has a step surface 82a or 83a which is a downstream side surface in the rotation direction Ya of the lifting gear 71 and which extends radially. A slope surface 82b or 83b is formed on the upstream side from an outer end of the step surface 82a or 83a so as to be connected smoothly up to the outer circumferential surface 81a.

A lock member 86 as an example of a stopping member is disposed on the right of the to-be-locked member 81. The lock member 86 has a solenoid 87 as an example of a stop driving source. The solenoid 87 is constituted by an electromagnetic coil in which a lead wire is wound around a shaft 87a. Accordingly, a magnetic force is generated in a front end portion of the shaft 87a when electricity is applied to the solenoid 87.

A lock lever 88 as an example of a body of the stopping member is disposed in front of the shaft 87a. The lock lever 88 in Example 1 is constituted by a plate of a magnetic substance. The lock lever 88 has a base end portion 88a supported rotatably on a frame of the lock member 86.

A tension spring 89 as an example of an urging member is supported on the base end of the lock lever 88. The tension spring 89 pulls the base end side of the lock lever 88. Accordingly, the lock lever 88 receives an elastic force of the tension spring 89 as a force in a direction to leave the shaft 87a of the solenoid 87.

A lock portion 88b as an example of a stopping portion is formed in a distal end portion of the lock lever 88. The lock portion 88b is formed into a shape which is bent from the lock lever 88 toward the to-be-locked member 81 side. The lock portion 88b is formed to be able to be engaged with the step surface 82a or 83a of the lock nail 82 or 83.

A cam 91 as an example of an operating member is disposed on a front surface of the cam gear 73. The cam 91 in Example 1 is formed into a columnar shape integral and coaxial with the cam gear 73 so as to protrude from the front of the cam gear 73. In addition, the cam 91 is formed to be able to make contact with the upper surface of the cam contact portion 28d of the second lever 28.

A short diameter surface 91a whose diameter from the shaft 72 serving as the center of rotation is extremely small is provided as an example of a first engagement portion in the outer circumferential surface of the cam 91. In addition, a long diameter surface 91b whose diameter is extremely large is provided as an example of a second engagement portion in a position where the long diameter surface 91b is shifted in phase by 90 degrees from the short diameter surface 91a. Each of the short diameter surface 91a and the long diameter surface 91b in Example 1 is formed into a so-called D-cut shape, which is a shape cut off to be flat, so that the rotation position thereof can be stabilized when the cam 91 makes contact with the cam contact portion 28d.

The short diameter portion 91a is formed correspondingly to a position in which the cam 91 makes contact with the cam contact portion 28d when the lock portion 88b makes contact with the step surface 82a of the first lock nail 82. On the other hand, the long diameter portion 91b is formed correspondingly to a position in which the cam 91 makes contact with the cam contact portion 28d when the lock portion 88b makes contact with the step surface 83a of the second lock nail 83.

(Description about Exit Roll Contact/Separation Operation)

FIGS. 6A to 6D are explanatory views of motion of the lifting gear in Example 1. FIG. 6A is an explanatory view of an initial position. FIG. 6B is an explanatory view in which the solenoid turns ON in the state shown in FIG. 6A. FIG. 6C is an explanatory view in which the lifting gear rotates in the state shown in FIG. 6B so as to turn OFF the solenoid. FIG. 6D is an explanatory view of a state in which the lifting gear rotates in the state shown in FIG. 6C so as to bring the lock lever into contact with the second lock nail.

FIGS. 7A to 7D are explanatory views of the motion of the lifting gear following FIG. 6D. FIG. 7A is an explanatory view of a state in which the lifting gear rotates in the state shown in FIG. 6D so as to separate the driven roll from the driving roll. FIG. 7B is an explanatory view in which the solenoid turns ON in the state shown in FIG. 7A. FIG. 7C is an explanatory view in which the lifting gear rotates in the state shown in FIG. 7B so as to turn OFF the solenoid. FIG. 7D is an explanatory view of a state in which the lifting gear rotates in the state shown in FIG. 7C so as to bring the lock lever into contact with the first lock nail.

In FIGS. 4A and 4B and FIGS. 6A to 6D, the solenoid 87 is OFF when the lifting gear 71 in Example 1 is in the initial position. Accordingly, the lock lever 88 moves to an engagement position shown in FIG. 6A due to the elastic force of the tension spring 89. Therefore, the lock lever 88 is retained in contact with the first lock nail 82. Thus, the lock gear 74 is retained in the state shown in FIG. 6A.

On this occasion, the short diameter surface 91a in the cam gear 73 is in contact with the cam contact portion 28d. The short diameter surface 91a in Example 1 has a flat surface shape. The posture of the short diameter surface 91a is stabilized in the state in which the short diameter surface 91a is in surface contact with the contact portion 28d. Accordingly, rotation of the cam gear 73 is restrained in accordance with the contact between the short diameter surface 91a and the contact portion 28d. Thus, the cam gear 73 is also retained in the state shown in FIG. 6A.

Incidentally, on this occasion, the elastic force of the torsion spring 79 acts between the cam gear 73 and the lock gear 74.

Accordingly, in the initial position shown in FIG. 6A, the first toothless portions 73c and 74c are retained to face the exit gear 37. Accordingly, rotation force is not transmitted to the lifting gear 71.

In addition, in FIG. 4B, the to-be-urged portion 28c of the second lever 28 is pulled by the coil spring 29 in this state. Accordingly, the lifting-up portion 28b is retained in the state where the lifting-up portion 28b cannot lift up the to-be-lifted-up portion 27a. Accordingly, the driven roll 22 is retained in contact with the driving roll 21 due to the coil spring 26.

When the solenoid 87 turns ON in the state shown in FIG. 6A, the lock lever 88 is separated from the first lock nail 82 in FIGS. 6A and 6B. Accordingly, the lock gear 74 is in a rotatable state. Accordingly, the elastic force of the torsion spring 79 acts on the lock gear 74, which rotates in the rotation direction Ya. Accordingly, the first gear portion 74a of the lock gear 74 is engaged with the exit gear 37, as shown in FIG. 6B.

When the first gear portion 74a of the lock gear 74 is engaged with the exit gear 37, the lock gear 74 rotates in accordance with rotation of the exit gear 37 in FIGS. 6B and 6C. When the lock gear 74 rotates, the lock gear 74 rotates relatively to the cam gear 73 in the range where the pin 76 is located inside the guide groove 77. When the pin 76 makes contact with an end of the guide groove 77, the rotation force is also transmitted to the cam gear 73. Accordingly, the cam gear 73 also begins to rotate, as shown in FIG. 6C. When the cam gear 73 begins to rotate, the first gear portion 73a of the cam gear 73 is engaged with the exit gear 37. Accordingly, the cam gear 73 and the lock gear 74 rotate due to the first gear portions 73a and 74a engaged with the exit gear 37.

On this occasion, the cam 91 also rotates so that the contact position of the cam 91 with the contact portion 28d can change from the short diameter surface 91a toward the long diameter surface 91b. Accordingly, the second lever 28 begins to rotate around the shaft portion 28a. Accordingly, the lifting-up portion 28b begins to lift up the to-be-lifted-up portion 27a so that the driven roll 22 can begin to be separated from the driving roll 21.

In addition, when the lock gear 74 rotates correspondingly to a separation time t4 which will be described later, the solenoid 87 turns OFF in FIG. 6C. Accordingly, the lock lever 88 moves to an engagement position shown in FIG. 6D due to the elastic force of the tension spring 89.

When the cam gear 73 and the lock gear 74 rotate, the first gear portion 74a of the lock gear 74 rotating ahead is separated from the exit gear 37 in FIG. 6C and FIG. 6D. Accordingly, the rotation force is not imparted to the lock gear 74 anymore. On this occasion, the cam gear 73 keeps on rotating because the first gear portion 73a is still engaged with the exit gear 37. Accordingly, when the cam gear 73 rotates, the lock gear 74 is pushed in the rotation direction through the torsion spring 79. On this occasion, the lock lever 88 moves to the engagement position. Accordingly, the lock gear 74 rotates until the lock gear 74 is stopped by the second lock nail 83 coming into contact with the lock lever 88.

When the subsequent cam gear 73 rotates, the first gear portion 73a is also separated from the exit gear 37 in FIG. 6D and FIG. 7A. On this occasion, the corner of the long diameter surface 91b goes beyond the contact portion 28d of the second lever 28. Accordingly, the cam 91 goes beyond the dead center, so that the cam 91 and the cam gear 73 can rotate until the long diameter surface 91b makes contact with the cam contact portion 28d due to the elastic force of the coil spring 29. Incidentally, the lock gear 74 is stopped by the lock lever 88.

Accordingly, as shown in FIG. 7A, the driven roll 22 is retained to be separated from the driving roll 21 in the state in which the long diameter surface 91b is in contact with the cam contact portion 28d.

When the solenoid 87 turns ON in the state shown in FIG. 7A, the lock gear 74 and the cam gear 73 rotate sequentially in the same manner as in the case of FIG. 6B to FIG. 6D and return to the initial position shown in FIG. 6A, in FIG. 7A to FIG. 7D. That is, the driven roll 22 returns to a contact state with the driving roll 21.

(Description about Control Portion in Example 1)

Figure 8:
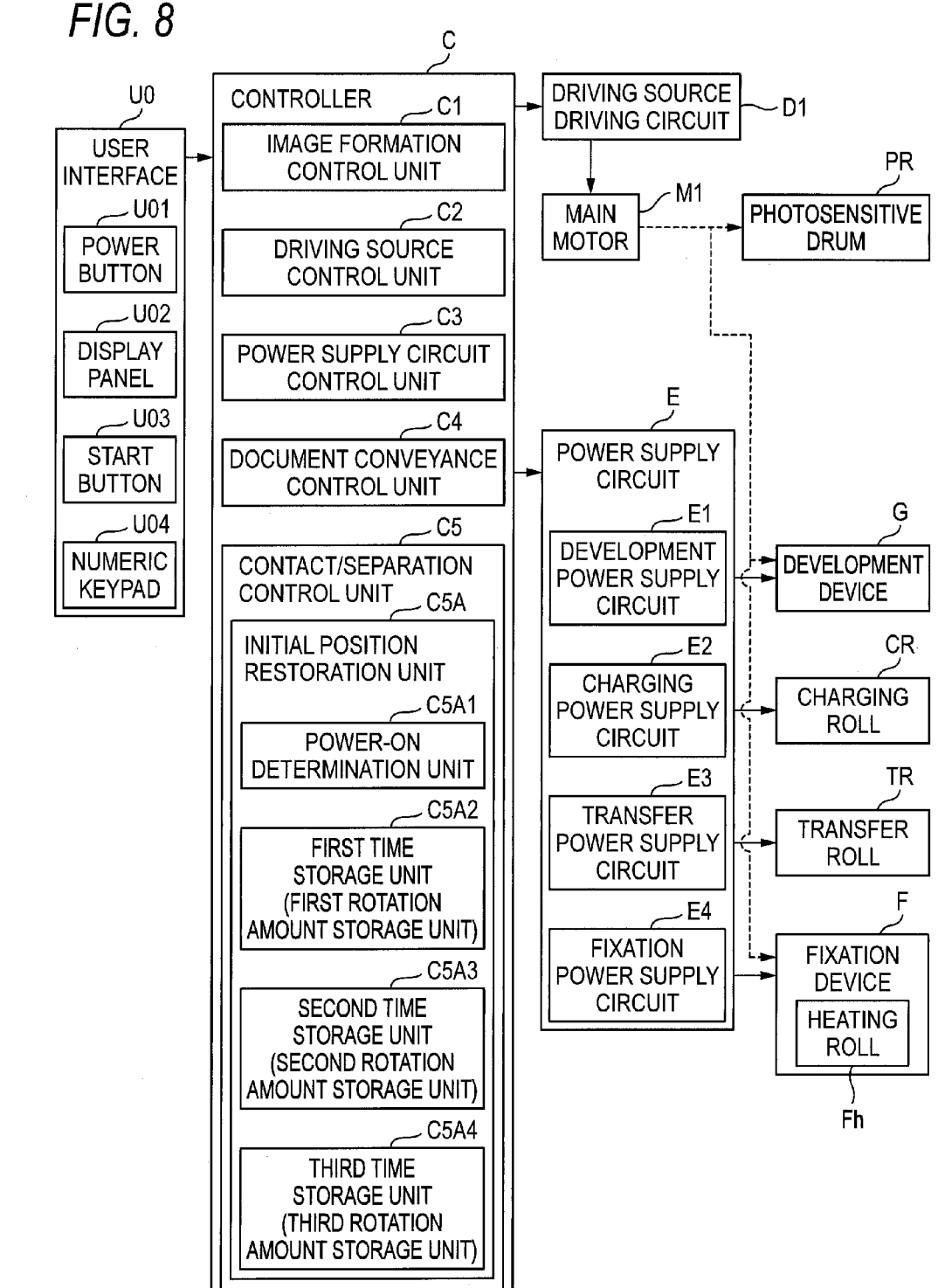
FIG. 8 is a block diagram showing respective functions provided by a control portion of the image forming apparatus according to Example 1.

FIG. 8 is a block diagram showing respective functions provided by a control portion of the image forming apparatus in Example 1.

In FIG. 8, a controller C as an example of a control portion belonging to the copying machine U has an input/output interface I/O which, for example, inputs/outputs a signal from/to the outside. In addition, the controller C has an ROM (Read Only Memory) in which programs and information etc. for performing necessary processing are stored. In addition, the controller C has an RAM (Random Access Memory) for temporarily storing necessary data. In addition, the controller C has a CPU (Central Processing Unit) which performs processing in accordance with the programs stored in the ROM etc. Accordingly, the controller C in Example 1 is constituted by a small-sized information processing device, i.e. a so-called microcomputer. Accordingly, the controller C can implement various functions by executing the programs stored in the ROM etc.

(Signal Output Elements Connected to Controller C)

The controller C of the printer portion U1 receives output signals from signal output elements such as the user interface U0 and the sensors 16 to 18.

U0: User Interface

The user interface U0 includes a power button U01 as an example of a power-on portion, a display panel U02 as an example of a display portion, a start button U03 as an example of an operation start input member, a numeric keypad U04 as an example of a numeric input member, other not-shown input buttons, etc.

The pre-register sensor 16 detects a document Gi which has been conveyed to the vicinity of the takeaway rolls 3.

The register sensor 17 detects the document Gi which has passed through the document register rolls 4.

The discharge sensor 18 detects the document Gi which has been conveyed toward the exit roll 8.

(Control Elements Connected to Controller C)

The controller C is connected to a driving source driving circuit D1, an automatic feeder driving circuit D2, a solenoid driving circuit D3, a power supply circuit E, and other not-shown control elements. The controller C outputs control signals to the respective circuits D1 to D3 and E etc.

D1: Driving Source Driving Circuit

The driving source driving circuit D1 drives a main motor M1 as an example of a driving source to drive and rotate the photosensitive drum PR, a developing agent retainer of the development device G, a transfer belt TB, the heating roll Fh of the fixation device F, the conveyance rolls Ra, etc.

D2: Automatic Feeder Driving Circuit

The automatic feeder driving circuit D2 as an example of a document conveyance device driving circuit controls driving of the motor unit M2 to drive and rotate the respective rolls 1 to 8 of the automatic feeder 3.

D3: Solenoid Driving Circuit

The solenoid driving circuit D3 as an example of a contact/separation driving circuit controls driving of the solenoid 87 to control movement of the lock lever 88.

E: Power Supply Circuit

The power supply circuit E has a development power supply circuit E1, a charging power supply circuit E2, a transfer power supply circuit E3, and a fixation power supply circuit E4.

E1: Development Power Supply Circuit

The development power supply circuit E1 applies a development voltage to the developing agent retainer of the development device G.

E2: Charging Power Supply Circuit

The charging power supply circuit E2 applies a charging voltage to the charging roll CR.

E3: Transfer Power Supply Circuit

The transfer power supply circuit E3 applies a transfer voltage to the transfer roll TR.

E4: Fixation Power Supply Circuit

The fixation power supply circuit E4 supplies heating electric power to a heating member of the heating roll Fh of the fixation device F.

(Function of Controller C)

The controller C has a function of executing processing in accordance with input signals from the signal output elements and outputting control signals to the respective control elements. That is, the controller C has the following functions.

C1: Image Formation Control Unit

An image formation control unit C1 controls reading of an image in the scanner portion U2, driving of the respective members of the copying machine U, respective voltage application timings, etc., to execute a job which is an image forming operation.

C2: Driving Source Control Unit

A driving source control unit C2 controls driving of the main motor M1 through the driving source driving circuit D1 to control driving of the photosensitive drum PR etc.

C3: Power Supply Circuit Control Unit

A power supply circuit control unit C3 controls the respective power supply circuits E1 to E4 to control the voltages applied to the respective members and electric power supplied to the respective members.

C4: Document Conveyance Control Unit

A document conveyance control unit C4 as an example of a discharge member control unit controls driving of the respective rolls 1 to 8 of the automatic feeder U3 through the automatic feeder driving circuit D2. The document conveyance control unit C4 in Example 1 rotates the motor unit M2 forward as soon as a job for reading a single side of a document Gi is started based on an input to the user interface U0. The document conveyance control unit C4 once stops the motor unit M2 as soon as the front end of the document Gi arrives at the position of the pre-register sensor 17. Then, the document conveyance control unit C4 drives the motor unit M2 again in accordance with timing when the document Gi is conveyed to the image reading position 6. The document conveyance control unit C4 stops the motor unit M2 when the job is completed.

In addition, the document conveyance control unit C4 in Example 1 rotates the motor unit M2 forward when a job for reading double sides of a document Gi is started. The document conveyance control unit C4 rotates the motor unit M2 backward as soon as the rear end of the document Gi is detected by the discharge sensor 18. Accordingly, after the conveyance direction of the fort and rear of the document Gi is reversed, the document Gi is conveyed to the reversal passage 11. In addition, the document conveyance control unit C4 changes the rotation of the motor unit M2 from backward rotation to forward rotation as soon as the document Gi which has been conveyed through the reversal passage 11 is detected by the pre-register sensor 16 and arrives at the takeaway rolls 3. Incidentally, in Example 1, in the case of double-side reading, the document conveyance control unit C4 further conveys the document Gi to the reversal passage 11 after the double-side reading so that the sequence of documents loaded in the document discharge tray TG2 can remain unchanged. That is, the document Gi is made to pass through the reversal passage 11 twice and pass through the image reading position 6 three times in total.

C5: Contact/Separation Control Unit

A contact/separation control unit C5 has an initial position restoration unit C5A, a reading control unit C5B, and a timer TM. The control/separation control unit C5 controls the lock lever 88 through the solenoid 87 to control contact/separation between the driving roll 21 and the driven roll 22.

C5A: Initial Position Restoration Unit

The initial position restoration unit C5A has a power-on determination unit C5A1 as an example of a restoration timing determination unit, a first time storage unit C5A2 as an example of a first rotation amount storage unit, a second time storage unit C5A3 as an example of a second rotation amount storage unit, and a third time storage unit C5A4 as an example of a third rotation amount storage unit. The initial position restoration unit C5A in Example 1 restores the position of the lifting gear 71 to an initial position which has been set in advance. In Example 1, the initial position is set as the position of the lifting gear 71 in which the lock lever 88 makes contact with the first lock nail 82 and the driving roll 21 makes contact with the driven roll 22.

C5A1: Power-on Determination Unit

The power-on determination unit C5A1 determines whether or not it is an event of power-on, which is an example of a restoration timing to the initial position. The power-on determination unit C5A1 in Example 1 determines whether it is an event of power-on or not, based on a power-on flag FL1 whose value is initialized to "0" when power is OFF.

C5A2: First Time Storage Unit

The first time storage unit C5A2 stores a first time t1 corresponding to a first rotation amount from the long diameter surface 91b to the short diameter surface 91a in the rotation direction of the lifting gear 71. Incidentally, in Example 1, the first rotation amount is set as a ¾ turn, i.e. 270 degrees. Accordingly, the first time t1 is set as a time when the lifting gear 71 can rotate to make a ¾ turn.

C5A3: Second Time Storage Unit

The second time storage unit C5A3 stores a second time t2 corresponding to a second rotation amount from the short diameter surface 91a to the long diameter surface 91b in the rotation direction of the lifting gear 71. Incidentally, in Example 1, the second rotation amount is set as a ½ turn, i.e. 180 degrees. Accordingly, the second time t2 is set as a time when the lifting gear 71 can rotate to make a ½ turn.

C5A4: Third Time Storage Unit

The third time storage unit C5A4 stores a third time t3 corresponding to a third rotation amount which is obtained by subtracting the second rotation amount from a rotation amount corresponding to one turn in the rotation direction of the lifting gear 71. Incidentally, in Example 1, the third rotation amount is set as a ½ turn, i.e. 180 degrees. Accordingly, the third time t3 is set as a time when the lifting gear 71 can rotate to make a ½ turn.

Incidentally, when power is on, the initial position restoration unit C5A in Example 1 turns OFF the solenoid 87 to thereby move the lock lever 88 to an engagement position where the lock lever 88 can make contact with the lock nail 82 or 83. When the first time t1 elapses, the initial position restoration unit C5A turns ON the solenoid 87 to thereby move the lock lever 88 to a release position where the lock lever 88 is separated from the lock nail 82 or 83. When the second time t2 elapses, the initial position restoration unit C5A turns OFF the solenoid 87 to thereby move the lock lever 88 to the engagement position. When the third time t3 elapses, the initial position restoration unit C5A completes the restoration operation to the initial position.

C5B: Reading Control Unit

The reading control unit C5B has a separation timing determination unit C5B1, a separation time storage unit C5B2, a contact timing determination unit C5B3, and a contact time storage unit C5B4. The reading control unit C5B controls contact/separation between the driving roll 21 and the driven roll 22 when an image of a document Gi is read.

C5B1: Separation Timing Determination Unit

The separation timing determination unit C5B 1 determines whether it is the timing to separate the driving roll 21 and the driven roll 22 from each other or not. As soon as the motor unit M2 has changed its rotation from backward rotation to forward rotation in a double-side reading operation, the separation timing determination unit C5B1 in Example 1 determines that it is the timing to separate the driving roll 21 and the driven roll 22 from each other.

C5B2: Separation Time Storage Unit

The separation time storage unit C5B2 stores a separation time t4, which is a time to turn ON the solenoid 87, in order to separate the driving roll 21 and the driven roll 22 from each other. In Example 1, the separation time t4 is set in advance as a time having a range in which the first lock nail 82 has passed through the position of the lock level 88 but the second lock nail 83 has not arrived at the position of the lock lever 88 in accordance with rotation of the lifting gear 71.

C5B3: Contact Timing Determination Unit

The contact timing determination unit C5B3 determines whether it is the timing to bring the driving roll 21 and the driven roll 22 into contact with each other or not. The contact timing determination unit C5B3 in Example 1 determines that it is the timing to bring the driving roll 21 and the driven roll 22 into contact with each other as soon as the discharge sensor 18 has detected the front end of the document Gi in the state in which the driving roll 21 and the driven roll 22 are separated from each other.

C5B4: Contact Time Storage Unit

The contact time storage unit C5B4 stores a contact time t5, which is a time to turn ON the solenoid, in order to bring the driving roll 21 and the driven roll 22 into contact with each other. In Example 1, the contact time t5 is set in advance as a time having a range in which the second lock nail 83 has passed through the position of the lock lever 88 but the first lock nail 82 has not arrived at the position of the lock lever 88 in accordance with the rotation of the lifting gear 71.

TM: Timer

The timer TM as an example of a time counting unit counts the respective times t1 to t5.

(Description about Flow Chart of Example 1)

Next, the flow of control in the copying machine U according to Example 1 will be described in accordance with a so-called flow chart.

(Description about Flow Chart of Exit Roll Contact/Separation Process in Example 1)

Figure 9:
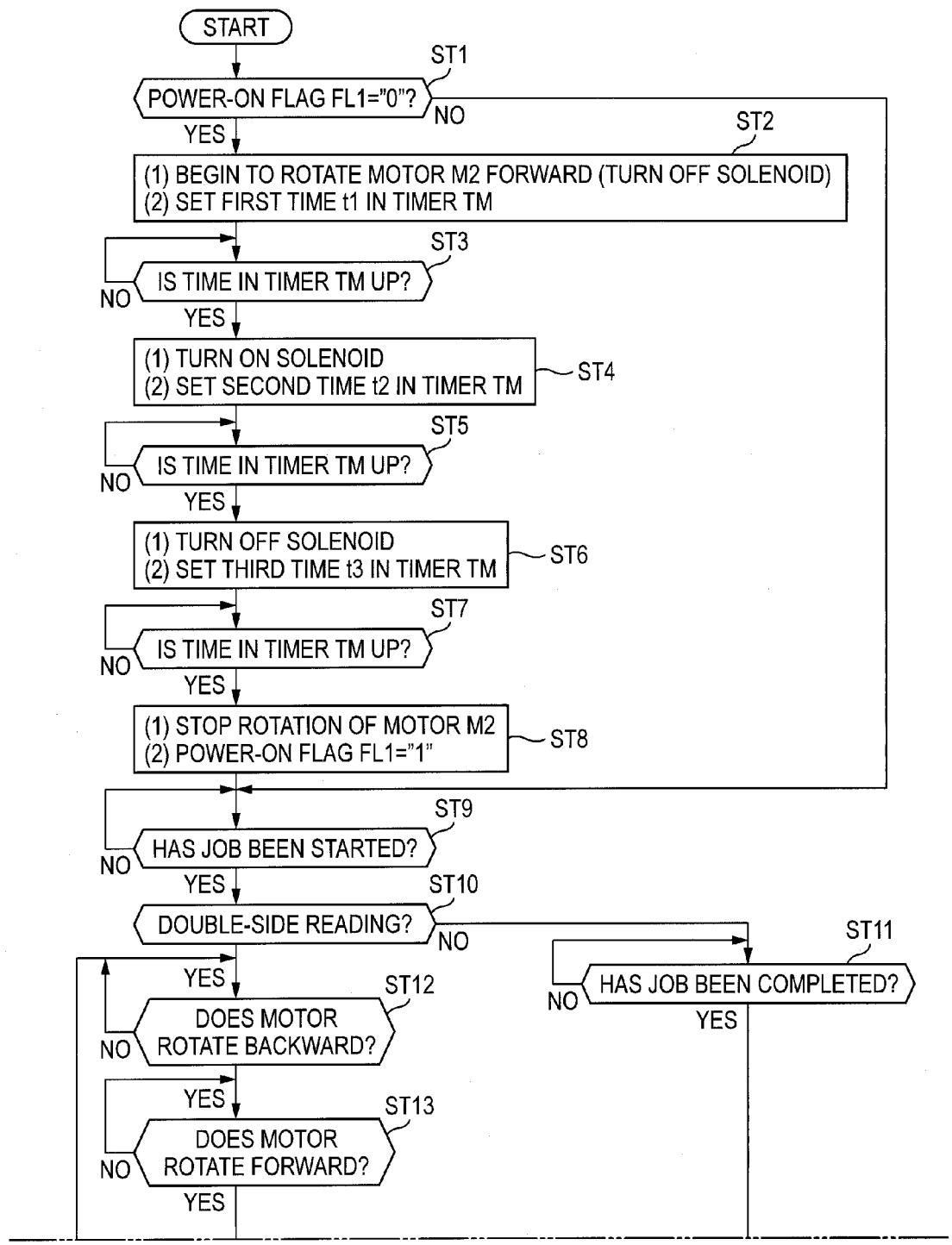
FIG. 9 is an explanatory view of a flow chart of an exit roll contact/separation process in Example 1.

FIG. 9 is an explanatory view of a flow chart of an exit roll contact/separation process in Example 1.

A process of respective steps ST in the flow chart of FIG. 9 is carried out in accordance with a program stored in the controller C of the copying machine U. In addition, this process can be executed in parallel with other various processes of the copying machine U.

The flow chart shown in FIG. 9 is started when the copying machine U is powered on.

In a step ST1 of FIG. 9, it is determined whether the power-on flag FL1 is "0" or not. If Yes (Y), the processing flow goes to a step ST2. If No (N), the processing flow goes to a step ST9.

In the step ST2, the following processes (1) and (2) are executed. Then, the processing flow goes to a step ST3.
(1) Begin to rotate the motor unit M2 forward
On this occasion, the solenoid 87 is retained in an OFF state.
(2) Set a first time t1 in the timer TM In the step ST3, it is determined whether the time in the timer TM is up or not. That is, it is determined whether the first time t1 has elapsed or not. If Yes (Y), the processing flow goes to a step ST4. If No (N), the processing flow repeats the step ST3.

In the step ST4, the following processes (1) and (2) are executed. Then, the processing flow goes to a step ST5.
(1) Turn ON the solenoid 87
(2) Set a second time t2 in the timer TM In the step ST5, it is determined whether the time in the timer TM is up or not. That is, it is determined whether the second time t2 has elapsed or not. If Yes (Y), the processing flow goes to a step ST6. If No (N), the processing flow repeats the step ST5.

In the step ST6, the following processes (1) and (2) are executed. Then, the processing flow goes to a step ST7.
(1) Turn OFF the solenoid 87
(2) Set a third time t3 in the timer TM In the step ST7, it is determined whether the time in the timer TM is up or not. That is, it is determined whether the third time t3 has elapsed or not. If Yes (Y), the processing flow goes to a step ST8. If No (N), the processing flow repeats the step ST7.

In the step ST8, the following processes (1) and (2) are executed. Then, the processing flow goes to the step ST9.
(1) Stop the motor unit M2
(2) Set the power-on flag FL as "1"

In the step ST9, it is determined whether a job has been started or not. If Yes (Y), the processing flow goes to a step ST10. If No (N), the processing flow repeats the step ST9.

In the step ST10, it is determined whether double-side reading of a document Gi is performed or not based on an input into the user interface U0. If No (N), the processing flow goes to a step ST11. If Yes (Y), the processing flow goes to a step ST12.

In the step ST11, it is determined whether the job has been completed or not. If Yes (Y), the processing flow returns to the step ST1. If No (N), the processing flow repeats the step ST11.

In the step ST12, it is determined whether the motor unit M2 has begun to rotate backward or not. If Yes (Y), the processing flow goes to a step ST13. If No (N), the processing flow repeats the step ST12.

In the step ST13, it is determined whether the motor unit M2 has begun to rotate forward or not. If Yes (Y), the processing flow goes to a step ST14. If No (N), the processing flow repeats the step ST13.

In the step ST14, the following processes (1) and (2) are executed. Then, the processing flow goes to a step ST15.
(1) Turn ON the solenoid 87
(2) Set a separation time t4 in the timer TM and begin to count the separation time t4

In the step ST15, it is determined whether the time in the timer TM is up or not. That is, it is determined whether the separation time t4 has elapsed or not. If Yes (Y), the processing flow goes to a step ST16. If No (N), the processing flow repeats the step ST15.

In the step ST16, the solenoid 87 is turned OFF. Then, the processing flow goes to a step ST17.

In the step ST17, it is determined whether the discharge sensor 18 has been turned ON or not. That is, it is determined whether the discharge sensor 18 has detected the front end of the document Gi or not. If Yes (Y), the processing flow goes to a step ST18. If No (N), the processing flow repeats the step ST17.

In the step ST18, the following processes (1) and (2) are executed. Then, the processing flow goes to a step ST19.
(1) Turn ON the solenoid 87
(2) Set a contact time t5 in the timer TM and begin to count the contact time t5

In the step ST19, it is determined whether the time in the timer TM is up or not. That is, it is determined whether the contact time t5 has elapsed or not. If Yes (Y), the processing flow goes to a step ST20. If No (N), the processing flow repeats the step ST19.

In the step ST20, the solenoid 87 is turned OFF. Then, the processing flow goes to a step ST21.

In the step ST21, it is determined whether the job has been completed or not. If No (N), the processing flow returns to the step ST12. If Yes (Y), the processing flow returns to the step ST1.

(Function of Automatic Feeder U3)

When it is the time to feed paper in the automatic feeder U3 having the aforementioned configuration in Example 1, the motor unit M2 rotates forward. In accordance with this, the nudger roll 1 extracts documents Gi stored in the document tray TG1. The document separation rolls 2 separate the documents Gi extracted by the nudger roll 1 one by one. The takeaway rolls 3 convey the documents Gi separated one by one by the document separation rolls 2. The document register rolls 4 deliver each of the documents Gi toward the downstream-side document reading position 6 in accordance with timing. The out rolls 7 convey the document Gi which has been read as an image in the image reading position 6, toward the downstream side.

In the case of single-side reading, the exit roll 8 conveys the document Gi toward the document discharge tray TG2.

In the case of double-side reading, when the downstream end of the document Gi in the conveyance direction passes through the discharge sensor 18, the motor unit M2 rotates backward. Accordingly, after the conveyance direction of the front and rear of the document Gi is reversed, the document Gi is conveyed toward the document reversal passage 11. The document Gi which has passed through the document reversal passage 11 is conveyed toward the takeaway rolls 3 again.

When the document Gi is conveyed to the takeaway rolls 3, the motor unit M2 changes its rotation from backward rotation to forward rotation. On this occasion, the solenoid 87 is operated to separate the driving roll 21 and the driven roll 22 of the exit roll 8 from each other via the states shown in FIG. 6A to FIG. 6D and FIG. 7A. Accordingly, when the motor unit M2 rotates forward, the document Gi may be pulled from both ends by the exit roll 8 and the takeaway rolls 3. However, in Example 1, the driving roll 21 and the driven roll 22 of the exit roll 8 are separated from each other. Therefore, the document Gi can be prevented from being pulled from both ends by the exit roll 8 and the takeaway rolls 3.

When the motor unit M2 begins to rotate forward, the takeaway rolls 3, the document register rolls 4, the out rolls 7 and the exit roll 8 begin to rotate forward. The document Gi which has been conveyed by the takeaway rolls 3 etc. passes through the image reading position 6 in the state in which the document Gi has been reversed inside out. Thus, an image of a second side of the document Gi can be read.

When the front end of the document Gi whose second side image has been read passes through the discharge sensor 18, the solenoid 87 is operated as in FIG. 6C and FIG. 6D. Accordingly, the driving roll 21 and the driven roll 22 make contact with each other via the states shown in FIG. 7A to FIG. 7D and FIG. 6A. Accordingly, the document Gi which has come near to the exit roll 8 is conveyed by the exit roll 8.

Here, document jamming may occur in the automatic feeder U3. When a user removes a jammed document, the lifting gear 71 may rotate, for example, due to the user's finger making contact with the lifting gear 71. When a work for removing the jammed document is performed in a power-off state, it is difficult to detect whether the lifting gear has rotated or not because control cannot be performed, for example, to apply brake to the lifting gear 71. When the rotation position of the lifting gear 71 is unknown, there is a fear that an operation of contacting/separating the driving roll 21 and the driven roll 22 with/from each other cannot be performed or such contact and separation may be replaced by each other. To solve this problem, in the background-art configuration, a sensor for detecting the rotation position of the lifting gear is used to return the rotation position to the initial position which has been set in advance. However, when such a sensor is used, there is a problem that the manufacturing cost increases.

Figure 10A:
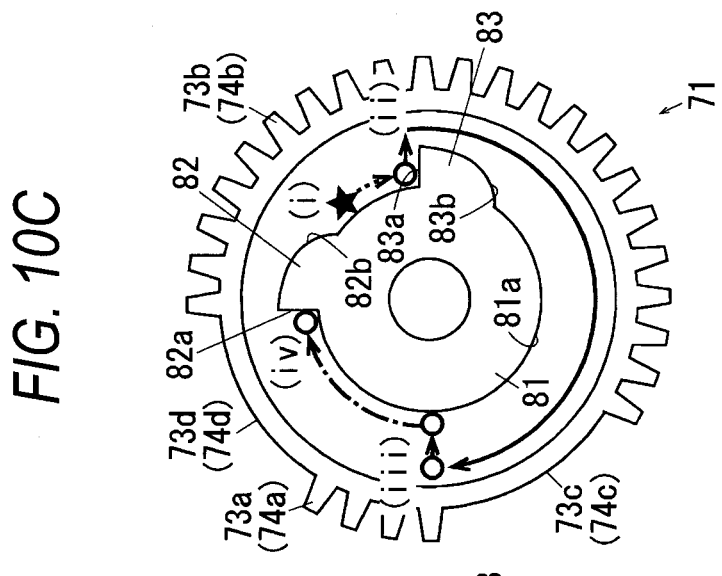
FIGS. 10A, 10B and 10C are explanatory views of restoration motion of the lifting gear to the initial position in Example 1, FIG. 10A being an explanatory view in which the lock lever is located on a downstream side of the first lock nail in a power-on state, FIG. 10B being an explanatory view in which the lock lever is located in an upstream side of the second lock nail in a power-on state, FIG. 10C being an explanatory view in which the lock lever is located on an upstream side of the first lock nail and on a downstream side of the second lock nail in a power-on state.
Figure 10B:
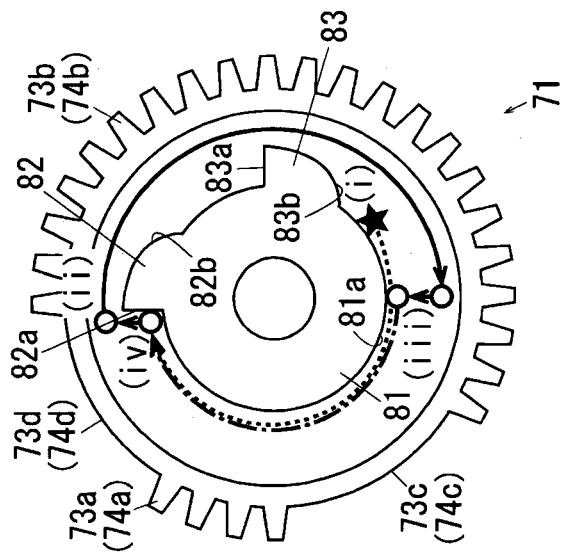
Figure 10C:
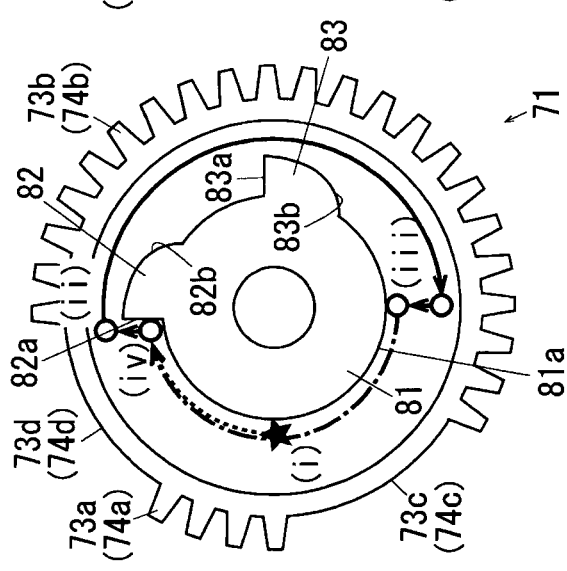

FIGS. 10A to 10C are explanatory views of the operation for restoring the position of the lifting gear to the initial position in Example 1. FIG. 10A is an explanatory view in which the lock lever is located on the downstream side of the first lock nail in a power-on state. FIG. 10B is an explanatory view in which the lock lever is located on the upstream side of the second lock nail in a power-on state. FIG. 10C is an explanatory view in which the lock lever is located on the upstream side of the first lock nail and on the downstream side of the second lock nail in a power-on state.

On the other hand, the process of the steps ST2 to ST8 is performed to restore the position of the lifting gear 71 in Example 1 to the initial position in a power-on state. When, for example, the lock lever 88 is located in a position (i) in FIG. 10A, the process of the steps ST2 and ST3 is performed to move the lock lever 88 to a position (ii). The process of the steps ST4 and ST5 is performed to move the lock lever 88 to a position (iii). The process of the steps ST6 and ST7 is performed to move the lock lever 88 to a position (iv). Even when the lock lever 88 is located in a position (i) in FIG. 10B or in a position (i) in FIG. 10C, the process of the steps ST2 to ST8 can be performed in the same manner to move the lock lever 88 to a position (iv), i.e. the initial position.

Accordingly, in Example 1 in which the restoration process to the initial position is performed, it is possible to restore the position of the lifting gear 71 to the initial position surely even without installation of any sensor for detecting the rotation position of the lifting gear 71. Accordingly, it is possible to suppress the manufacturing cost in Example 1, in comparison with that in the background-art configuration in which the sensor is used.

(Modifications)

Although the Example of the invention has been described above in detail, the invention is not limited to the aforementioned Example but may be modified variously within the spirit and scope of the invention described in the scope of claims. Modifications (H01) to (H07) of the invention may be exemplified as follows.

(H01) Although the copying machine U as an example of an image forming apparatus has been exemplified in the Example, the invention is not limited thereto but may be applied to a printer, a facsimile machine or a complex machine etc. having these functions. In addition, the invention is not limited to an image forming apparatus for monochrome development but may be formed as a so-called color image forming apparatus for multicolor development.

(H02) Although it is desirable that the Example has the configuration that the document Gi whose second side has been read passes through the reversal passage 11 again, the document Gi whose second side has been read may be conveyed not to the reversal passage 11 but to the document discharge tray TG2.

(H03) Although the configuration of the transmission system in which the document register rolls 4 and the out rolls 7 also rotate backward during backward rotation of the exit roll 8 has been exemplified in the Example, the invention is not limited thereto. For example, driving of the document register rolls 4 or the out rolls 7 may be transmitted not through the seventh intermediate gear 46 but through the eleventh intermediate gear 66. Thus, the document register rolls 4 or the out rolls 7 can keep on rotating in the same rotation direction and in the same manner as the takeaway rolls 3 regardless of whether the motor unit M2 is rotated forward/backward. In addition, although it is desirable that all the rolls 1 to 8 are driven by one motor unit M2, configuration may be made in such a manner that, for example, only the exit roll 8 is driven by one motor which can rotate forward and backward while the other rolls 1 to 7 are driven by another motor which can rotate only forward. In addition, the number or location relation of gears in the transmission system is not limited to that in the exemplified configuration but any change may be made in accordance with the design or specification etc. For example, the number or locations of gears may be changed.

(H04) In the Example, the installation positions of the sensors 16 to 18 and control based on these sensors 16 to 18 may be changed suitably in accordance with the design or specification.

(H05) Although the configuration in which the angle formed between the first lock nail 82 and the second lock nail 83 is set as 90 degrees has been exemplified in the Example, the invention is not limited thereto. The angle formed between the first lock nail 82 and the second lock nail 83 may be set as any angle except 180 degrees in accordance with the design or specification etc. Incidentally, when the angle formed thus is changed, the gear portions 73a, 73b, 74a and 74b and the first to third rotation amounts may be changed correspondingly.

(H06) Although the configuration in which a pair of gears having toothless portions is used as the lifting gear 71 has been exemplified in the Example, the invention is not limited thereto. For example, any configuration may be used so that an electromagnetic clutch and gears can be combined to change over between transmission and non-transmission of the driving.

(H07) Although the configuration in which the driven roll 22 is brought into contact with or separated from the driving roll 21 has been exemplified in the Example, the invention is not limited thereto. For example, configuration may be made so that the driving roll 21 can be brought into contact with or separated from the driven roll 22. In addition, both the driving roll 21 and the driven roll 22 may be moved in a direction to come into contact with each other or leave each other.

EXAMPLE 2

FIG. 1 is an explanatory view of an image forming apparatus according to Example 2 of the invention. Description about FIG. 1 in Example 1 is also applied to Example 2. Therefore, description of FIG. 1 will be omitted here.

(Description of Image Forming Operation)

Description about the image forming operation in Example 1 is also applied to Example 2. Therefore, description of the image forming operation will be omitted here.

(Description about Automatic Feeder U3)

FIG. 2 is an enlarged explanatory view of a main part of a document conveyance device according to Example 2. Description about FIG. 2 and Description about the automatic feeder U3 in Example 1 are also applied to Example 2. Therefore, description of FIG. 2 and description of the automatic feeder U3 will be omitted here.

(Description about Transmission System of Document Conveyance Device)

Figure 11A:
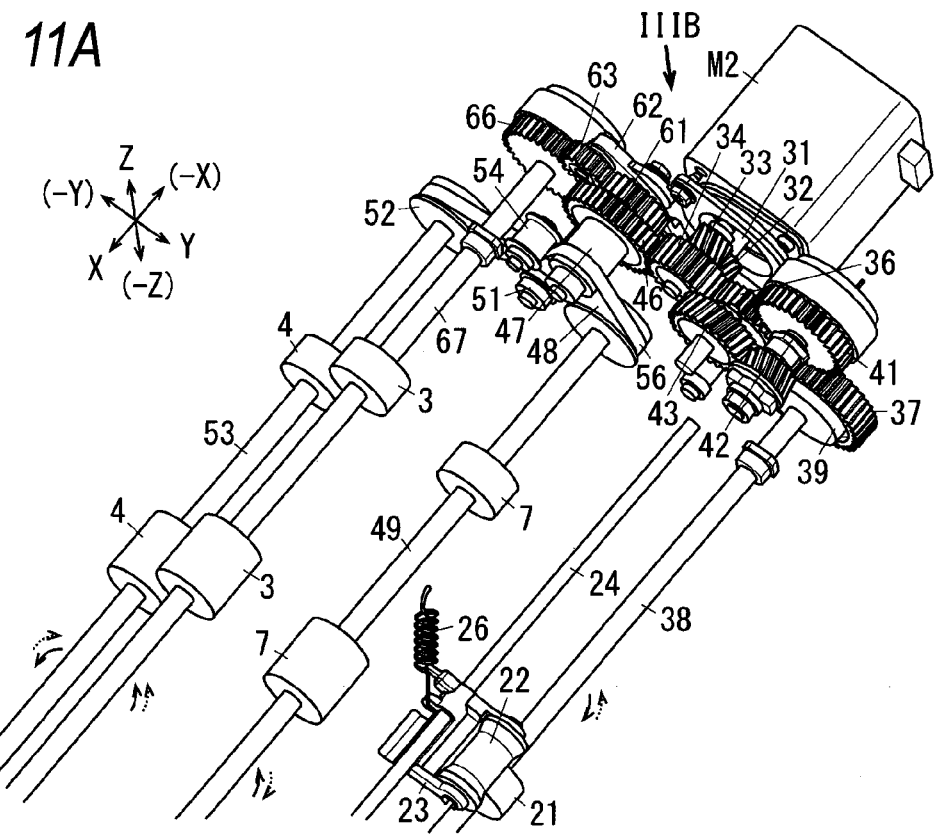
FIGS. 11A and 11B are explanatory views of a transmission system of a document conveyance device according to Example 2, FIG. 11A being a perspective view, FIG. 11B being a view seen from the direction of an arrow IIIB of FIG. 11A.
Figure 11B:
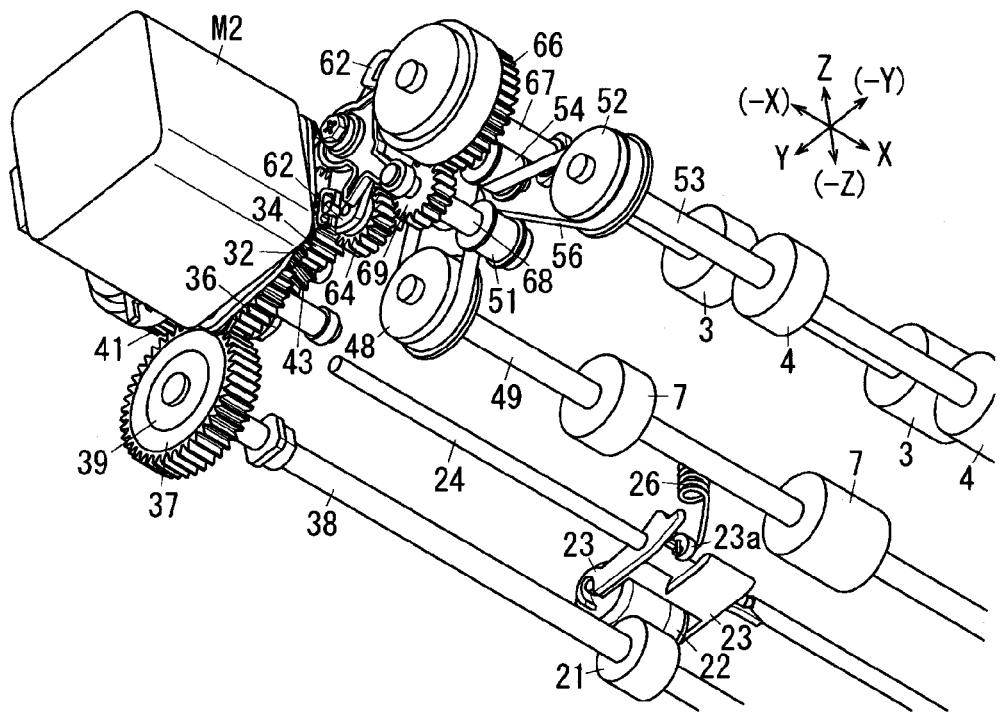

FIGS. 11A and 11B are explanatory views of a transmission system of the document conveyance device in Example 2. FIG. 11A is a perspective view. FIG. 11B is a view seen from the direction of an arrow IIIB of FIG. 11A.

In FIGS. 11A and 11B, an exit roll 8 in Example 2 has a driving roll 21 as an example of a driving member disposed on the lower side. A driven roll 22 as an example of a driven member is disposed above the driving roll 21. A shaft of the driven roll 22 is supported rotatably on a distal end of an arm 23 serving as an example of a support member. A base end of the arm 23 is supported rotatably on a support shaft 24 extending in the front/rear direction. A pressing support portion 23a is formed in a base end portion of the arm 23. One end of a coil spring 26 as an example of a pressing member is supported on the pressing support portion 23a. The coil spring 26 urges the pressing support portion 23a upward. Accordingly, the driven roll 22 is pressed against the driving roll 21 by the force of the coil spring 26.

Incidentally, the material of the driving roll 21 in Example 2 is selected and high friction treatment is applied to the surface of the driving roll 21 so that a friction coefficient $\mu 1$ between the driving roll 21 and each of documents Gi and a friction coefficient $\mu 2$ between adjacent ones of the documents Gi satisfy the relation $\mu 1 > \mu 2$. That is, the driving roll 21 is formed to satisfy the relation $\mu 1 > \mu 2$ even for the documents Gi which have the largest friction coefficient $\mu 2$ among paper kinds of documents Gi which can be used by the automatic feeder 3.

In addition, the exit roll 8 in Example 2 does not have a configuration in which the driving roll 21 and the driven roll 22 can be brought into contact with each other or separated from each other as in the background art.

A motor unit M2 as an example of a driving source is supported on a rear portion of the automatic feeder U3. Incidentally, the motor unit M2 in Example 2 is constituted by a motor unit which can rotate forward and backward.

A driving gear 32 as an example of a gear is supported on an output shaft 31 of the motor unit M2. A first intermediate gear 33 as an example of a gear is engaged with the driving gear 32. A second intermediate gear 34 as an example of a gear is supported on the same shaft for the first intermediate gear 33. A third intermediate gear 36 as an example of a gear is engaged with the second intermediate gear 34.

An exit gear 37 as an example of a gear is engaged with the third intermediate gear 36. The exit gear 37 is supported on a rear end of a shaft 38 of the driving roll 21 of the exit roll 8. In Example 2, a torque limiter 39 serving as an example of an allowing member and as an example of a driving cutting-off member is supported between the shaft 38 of the driving roll 21 and the exit gear 37. When a torque of the torque limiter 39 not higher than a rotation force which has been set in advance, i.e. a torque which has been set in advance acts between the shaft 38 and the exit gear 37, a driving force transmitted from the motor unit M2 to the exit gear 37 is transmitted to the shaft 38. Accordingly, the driving roll 21 rotates. On the other hand, when the torque of the torque limiter 39 higher than the torque which has been set in advance acts between the shaft 38 and the exit gear 37, the driving force transmitted to the exit gear 37 is not transmitted to the shaft 38. That is, the driving force transmitted from the motor unit M2 is cut off by the torque limiter 39.

Incidentally, a fourth intermediate gear 41 as an example of a gear is engaged with the third intermediate gear 36. A fifth intermediate gear 42 as an example of a gear is supported on the same shaft for the fourth intermediate gear 41 through a clutch serving as an example of a driving changeover member. A sixth intermediate gear 43 as an example of a gear is engaged with the fifth intermediate gear 42. A not-shown gear of a shaft of the document separation roll 2 is engaged with the sixth intermediate gear 43. Incidentally, configuration is made so that the driving can be transmitted from the document separation roll 2 to the nudger roll 1 through the not-shown gear.

In addition, a seventh intermediate gear 46 as an example of a gear is engaged with the second intermediate gear 34. A first pulley 47 as an example of a rotation transmission member is supported on the same shaft for the seventh intermediate gear 46 and in front of the seventh intermediate gear 46. A second pulley 48 as an example of a rotation transmission member is disposed under the first pulley 47. The second pulley 48 is supported on a driving shaft 49 of the out rolls 7.

A third pulley 51 as an example of a rotation transmission member is disposed on the left of the second pulley 48. A fourth pulley 52 as an example of a rotation transmission member is disposed on the left of the third pulley 51. The fourth pulley 52 is supported on a driving shaft 53 of the document register rolls 4.

A fifth pulley 54 as an example of a rotation transmission member is disposed on an upper right side of the fourth pulley 52. A transmission belt 56 as an example of a rotation transmission member is laid around the respective pulleys 47 to 54.

An eighth intermediate gear 61 as an example of a gear is supported on the same shaft for the seventh intermediate gear 46 and in the rear of the seventh intermediate gear 46. A swing arm 62 as an example of a changeover member is supported on the shaft of the seventh intermediate gear 46, the first pulley 47 and the eighth intermediate gear 61. A center portion of the swing arm 62 is supported rotatably on the shaft of the seventh intermediate gear 46 etc.

A ninth intermediate gear 63 as an example of a gear is supported on an upper portion of the swing arm 62. In addition, a tenth intermediate gear 64 as an example of a gear is supported on a lower portion of the swing arm 62. Both the ninth intermediate gear 63 and the tenth intermediate gear 64 are engaged with the eighth intermediate gear 61.

An eleventh intermediate gear 66 as an example of a gear is disposed on the left of the eighth intermediate gear 61. The eleventh intermediate gear 66 is supported on a shaft 67 of the takeaway rolls 3.

In FIG. 11B, a twelfth intermediate gear 69 as an example of a gear is supported rotatably on a rear portion of a shaft 68 of the third pulley 51. The twelfth intermediate gear 69 is engaged with the eleventh intermediate gear 66.

When the motor unit M2 is driven and rotated forward, the respective gears 32 to 69 are rotated on the swing arm 62 in a direction designated by arrows of solid lines in FIG. 11A. Accordingly, the ninth intermediate gear 63 and the tenth intermediate gear 64 move along the outer circumference of the eighth intermediate gear 61, resulting in a state shown in FIG. 11A and FIG. 11B. Accordingly, the ninth intermediate gear 63 is engaged with the eleventh intermediate gear 66 and the tenth intermediate gear 64 is separated from the twelfth intermediate gear 69.

On the other hand, when the motor unit M2 is driven and rotated backward, the respective gears 32 to 69 are rotated in directions designated by arrows of broken lines in FIG. 11A. Accordingly, the ninth intermediate gear 63 and the tenth intermediate gear 64 move along the outer circumference of the eighth intermediate gear 61. The ninth intermediate gear 63 is separated from the eleventh intermediate gear 66 and the tenth intermediate gear 64 is engaged with the twelfth intermediate gear 69.

A driving transmission system 31 to 69 in Example 2 is constituted by the respective members referred to by the numerals 31 to 69.

Accordingly, when the motor unit M2 is driven and rotated forward, the forward rotation is transmitted from the driving gear 32 to the exit gear 37 through the intermediate gears 33 to 36 in the driving transmission system 31 to 69 in Example 2. Accordingly, the driving roll 21 of the exit roll 8 rotates in a direction to convey a document Gi toward the document discharge tray TG2. In addition, the rotation is transmitted to the document register rolls 4 and the out rolls 7 through the driving gear 32, the first intermediate gear 33, the second intermediate gear 34, the seventh intermediate gear 46, the pulleys 47 to 54 and the transmission belt 56 so that the document register rolls 4 and the out rolls 7 can rotate in the direction to convey the document Gi toward the downstream side in the conveyance direction. Further, the rotation is transmitted to the takeaway rolls 3 through the driving gear 32, the first intermediate gear 33, the second intermediate gear 34, the seventh intermediate gear 46, the eighth intermediate gear 61, the ninth intermediate gear 63, and the eleventh intermediate gear 66 so that the takeaway rolls 3 can rotate in the direction to convey the document Gi toward the downstream side in the conveyance direction. In addition, the rotation is transmitted also to the document separation roll 2 or the nudger roll 1 through the driving gear 32, the intermediate rolls 33 to 36 and 41 to 43 so that the document separation roll 2 or the nudger roll 1 can rotate in the direction to convey the document Gi toward the downstream side in the conveyance direction. Incidentally, the rotation is transmitted to the document separation roll 2 or the nudger roll 1 when the clutch provided in the fourth intermediate gear 41 is connected. The rotation is not transmitted to the document separation roll 2 or the nudger roll 1 when the clutch is disconnected.

In addition, when the motor unit M2 is rotated backward, the driving is transmitted to the driving transmission system 31 to 69 in Example 2 in the same manner as when the motor unit M2 is rotated forward so that the exit roll 8, the document register rolls 4 and the out rolls 7 can rotate backward. On the other hand, the rotation is transmitted to the takeaway rolls 3 through the driving gear 32, the first intermediate gear 33, the second intermediate gear 34, the seventh intermediate gear 46, the eighth intermediate gear 61, the tenth intermediate gear 64, the twelfth intermediate gear 69 and the eleventh intermediate gear 66 so that the takeaway rolls 3 can rotate in the same direction in which the document Gi is conveyed toward the downstream side in the conveyance direction as when the motor unit M2 is rotated forward. That is, the takeaway rolls 3 in Example 2 rotate in the same rotation direction regardless of whether the motor unit M2 is rotated forward or backward. Incidentally, the clutch is disconnected not to transmit the backward rotation to the document separation roll 2 or the nudger roll 1 in Example 2.

(Description about Control Portion in Example 2)

Figure 12:
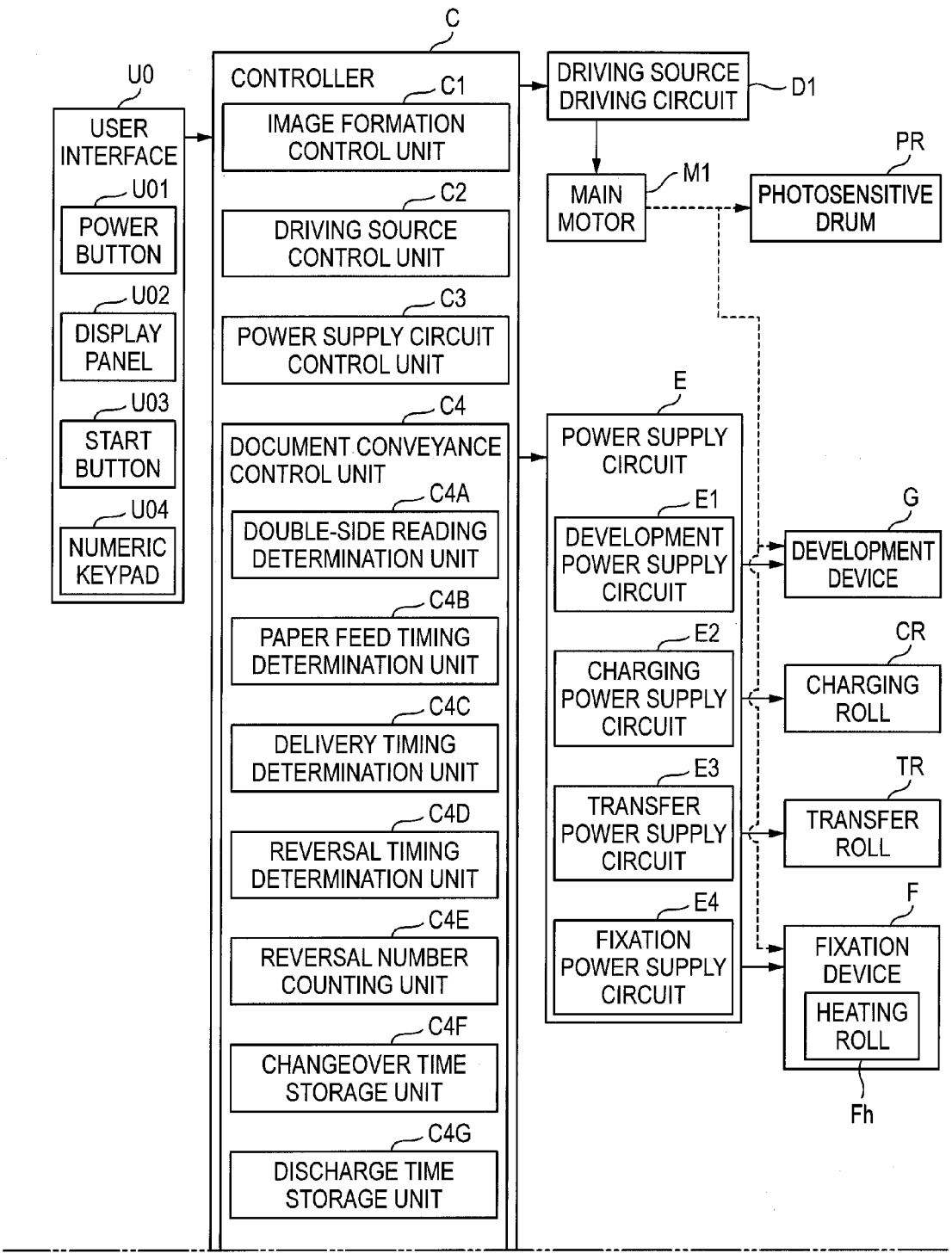
FIG. 12 is a block diagram showing respective functions provided by a control portion of the image forming apparatus according to Example 2.

FIG. 12 is a block diagram showing respective functions provided by a control portion of the image forming apparatus in Example 2.

In FIG. 12, a controller C as an example of a control portion belonging to a copying machine U has an input/output interface I/O which, for example, inputs/outputs a signal from/to the outside. In addition, the controller C has an ROM (Read Only Memory) in which programs and information etc. for performing necessary processing are stored. In addition, the controller C has an RAM (Random Access Memory) for temporarily storing necessary data. In addition, the controller C has a CPU (Central Processing Unit) which performs processing in accordance with the programs stored in the ROM etc. Accordingly, the controller C in Example 2 is constituted by a small-sized information processing device, i.e. a so-called microcomputer. Accordingly, the controller C can implement various functions by executing the programs stored in the ROM etc.

(Signal Output Elements Connected to Controller C)

The controller C of the printer portion U1 receives output signals from signal output elements such as a user interface U0, sensors 16 to 18, etc.

U0: User Interface

The user interface U0 includes a power button U01 as an example of a power-on portion, a display panel U02 as an example of a display portion, a start button U03 as an example of an operation start input member, a numeric keypad U04 as an example of a numeric input member, other not-shown input buttons, etc.

The pre-register sensor 16 detects a document Gi which has been conveyed to the vicinity of the takeaway rolls 3.

The register sensor 17 detects the document Gi which has passed through the document register rolls 4.

The discharge sensor 18 detects the document Gi which has been conveyed toward the exit roll 8.

(Control Elements Connected to Controller C)

The controller C is connected to a driving source driving circuit D1, an automatic feeder driving circuit D2, a power supply circuit E, and other not-shown control elements. The controller C outputs control signals to the respective circuits D1 and D2 and E etc.

D1: Driving Source Driving Circuit

The driving source driving circuit D1 drives a main motor M1 as an example of a driving source to drive and rotate a photosensitive drum PR, a developing agent retainer of a development device G, a transfer belt TB, a heating roll Fh of a fixation device F, conveyance rolls Ra, etc.

D2: Automatic Feeder Driving Circuit

The automatic feeder driving circuit D2 as an example of a document conveyance device driving circuit controls driving of the motor unit M2 to drive and rotate the respective rolls 1 to 8 of the automatic feeder 3.

E: Power Supply Circuit

The power supply circuit E has a development power supply circuit E1, a charging power supply circuit E2, a transfer power supply circuit E3, and a fixation power supply circuit E4.

E1: Development Power Supply Circuit

The development power supply circuit E1 applies a development voltage to the developing agent retainer of the development device G.

E2: Charging Power Supply Circuit

The charging power supply circuit E2 applies a charging voltage to a charging roll CR.

E3: Transfer Power Supply Circuit

The transfer power supply circuit E3 applies a transfer voltage to a transfer roll TR.

E4: Fixation Power Supply Circuit

The fixation power supply circuit E4 supplies heating electric power to a heating member of the heating roll Fh of the fixation device F.

(Function of Controller C)

The controller C has a function of executing processing in accordance with input signals from the signal output elements and outputting control signals to the respective control elements. That is, the controller C has the following functions.

C1: Image Formation Control Unit

An image formation control unit C1 controls reading of an image in a scanner portion U2, driving of the respective members of the copying machine U, respective voltage application timings, etc. to execute a job which is an image forming operation.

C2: Driving Source Control Unit

A driving source control unit C2 controls driving of the main motor M1 through the driving source driving circuit D1 to control driving of the photosensitive drum PR etc.

C3: Power Supply Circuit Control Unit

A power supply circuit control unit C3 controls the respective power supply circuits E1 to E4 to control the voltages applied to the respective members and electric power supplied to the respective members.

C4: Document Conveyance Control Unit

A document conveyance control unit C4 as an example of a discharge member control unit controls driving of the respective rolls 1 to 8 of the automatic feeder U3 through the automatic feeder driving circuit D2. The document conveyance control unit C4 in Example 2 has a double-side reading determination unit C4A, a paper feed timing determination unit C4B, a delivery timing determination unit C4C, a reversal timing determination unit C4D, a reversal number counting unit C4E, a changeover time storage unit C4F, a discharge time storage unit C4G, a timer TM, a forward rotation control unit C4H, and a backward rotation control unit C4J.

C4A: Double-Side Reading Determination Unit

The double-side reading determination unit C4A determines whether to perform double-side reading of a document Gi or not, based on an input to the user interface U0.

C4B: Paper Feed Timing Determination Unit

The paper feed timing determination unit C4B determines whether it is the timing to feed the document Gi or not. The paper feed timing determination unit C4B in Example 2 determines that it is the timing to feed the document Gi in accordance with a control signal from the image formation control unit C1. As soon as the timing to feed the document is determined, the nudger roll 1 is driven.

C4C: Delivery Timing Determination Unit

The delivery timing determination unit C4C determines whether it is the timing to deliver the document Gi to an image reading position 6 or not. The delivery timing determination unit C4C determines whether it is the timing to deliver the document Gi from the document register rolls 4 or not, in accordance with a control signal from the image formation control unit C1.

C4D: Reversal Timing Determination Unit

The reversal timing determination unit C4D determines whether it is the timing to convey the document Gi to a document reversal passage 11 or not, based on a detection result of the discharge sensor 18. The reversal timing determination unit C4D in Example 2 determines that it is the timing to convey the document Gi to the document reversal passage 11 as soon as a rear end of the document Gi in a conveyance direction passes through the position of the discharge sensor 18. That is, when the document Gi detection result of the discharge sensor 18 changes from "document presence" to "document absence", the reversal timing determination unit C4D determines that it is the timing to convey the document Gi to the document reversal passage 11.

C4E: Reversal Number Counting Unit

The reversal number counting unit C4E counts a number $\underline{n}$ with which the document Gi has been conveyed to the document reversal passage 11.

C4F: Changeover Time Storage Unit

The changeover time storage unit C4F stores a changeover time t1 which is a time from when the document Gi which has been conveyed through the document reversal passage 11 is detected by the pre-register sensor 16 to when the rotation direction of the motor unit M2 is changed over from backward rotation to forward rotation.

C4G: Discharge Time Storage Unit

In the case where the document Gi is discharged to a document discharge tray TG2, the discharge time storage unit C4G stores a discharge time t2 which is a time from when the discharge sensor 18 detects the rear end of the document Gi to when the document Gi is discharged to the document discharge tray TG2 and the motor unit M2 is stopped.

TM: Timer

The timer TM as an example of a time counting unit counts the respective times t1 and t2.

C4H: Forward Rotation Control Unit

The forward rotation control unit C4H controls forward rotation driving of the motor unit M2 based on the control signals from the image formation control unit C1 and the detection results of the respective sensors 16 to 18. When the document Gi should be conveyed, the forward rotation control unit C4H in Example 2 rotates the motor unit M2 forward to convey the document Gi to the downstream side through the nudger roll 1, the document separation rolls 2 and the takeaway rolls 3. As soon as the register sensor 17 detects the document Gi, the forward rotation control unit C4H temporarily stops the motor unit M2. When determination is made that it is the timing to deliver the document Gi, the forward rotation control unit C4H resumes forward rotation of the motor unit M2. When the document Gi should not be reversed, the forward rotation control unit C4H stops forward rotation of the motor unit M2 after a lapse of the discharge time t2 since the rear end of the document Gi passes through the discharge sensor 18. When the document Gi should be reversed, the forward rotation control unit C4H stops forward rotation of the motor unit M2 as soon as the rear end of the document Gi passes through the discharge sensor 18. The forward rotation control unit C4H rotates the motor unit M2 forward after a lapse of the changeover time t1 since the document which has been conveyed through the document reversal passage 11 is detected by the pre-register sensor 16.

C4J: Backward Rotation Control Unit

The backward rotation control unit C4J controls backward rotation driving of the motor unit M2 based on the detection results of the pre-register sensor 16 and the discharge sensor 18. When the document Gi should be reversed, the backward rotation control unit C4J in Example 2 rotates the motor unit M2 backward as soon as forward rotation stops after the rear end of the document Gi passes through the discharge sensor 18. The backward rotation control unit C4J stops the motor unit M2 after a lapse of the changeover time t1 since the document Gi which has been conveyed through the document reversal passage 11 is detected by the pre-register sensor 16.

(Description about Flow Chart of Example 2)

Next, the flow of control in the copying machine U according to Example 2 will be described in accordance with a so-called flow chart.

(Description about Flow Chart of Document Conveyance Process in Example 2)

Figure 13:
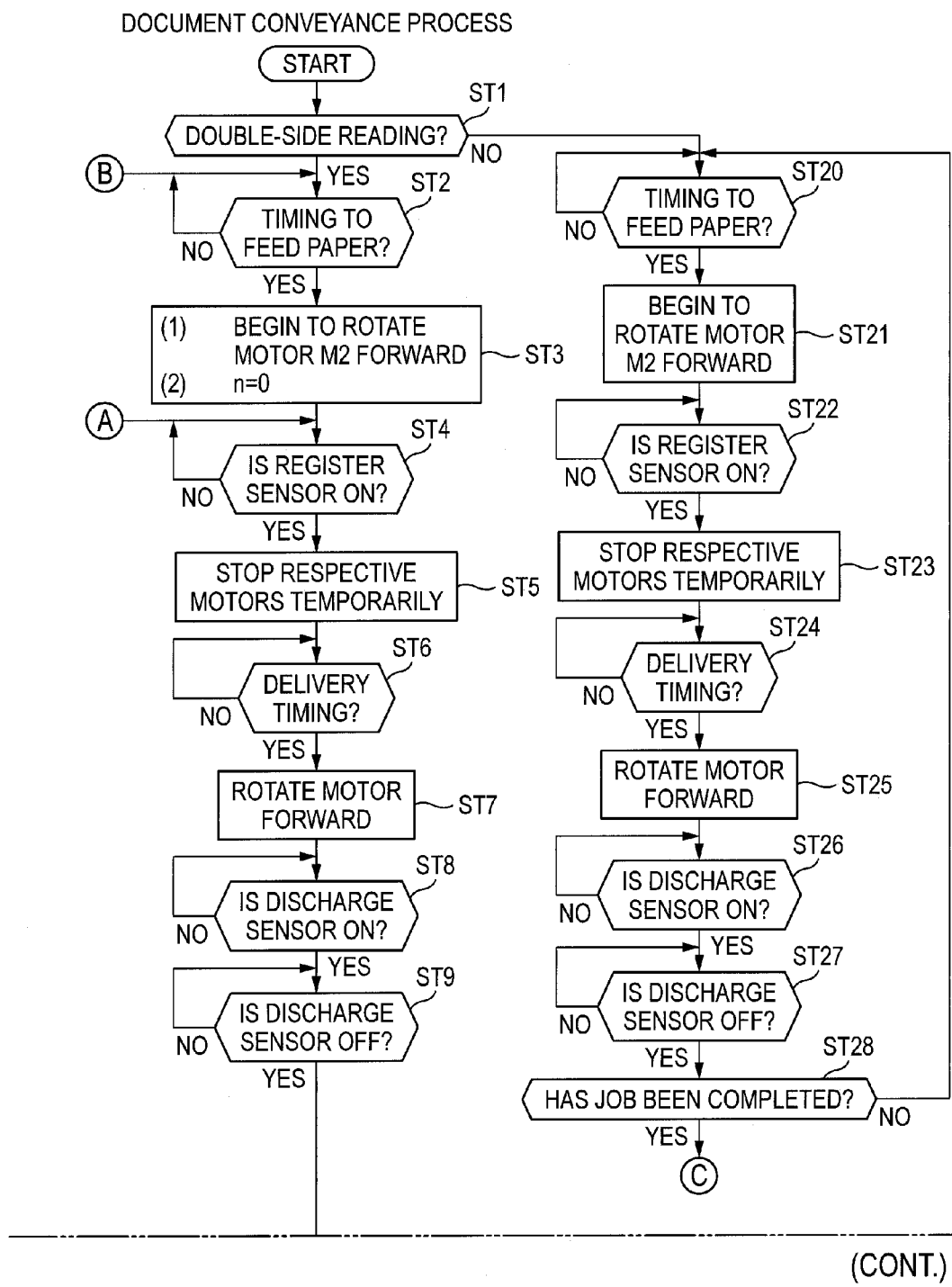
FIG. 13 is an explanatory view of a flow chart of a document conveyance process in Example 2.

FIG. 13 is an explanatory view of a flow chart of a document conveyance process in Example 2.

A process of respective steps ST in the flow chart of FIG. 13 is carried out in accordance with a program stored in the controller C of the copying machine U. In addition, this process can be executed in parallel with other various processes of the copying machine U.

The flow chart shown in FIG. 13 is started when the copying machine U is powered on.

In a step ST1 of FIG. 13, it is determined whether double-side reading has been set or not, based on an input to the user interface U0. If Yes (Y), the processing flow goes to a step ST2. If No (N), the processing flow goes to a step ST20.

In the step ST2, it is determined whether it is the timing to feed paper or not. If Yes (Y), the processing flow goes to a step ST3. If No (N), the processing flow repeats the step ST2.

In the step ST3, the following processes (1) and (2) are executed. Then, the processing flow goes to a step ST4.
(1) Drive and rotate the motor unit M2 forward and rotate the respective rolls 1 to 8 accordingly
(2) Initialize the reversal number n to 0 (i.e. set n=0)

In the step ST4, it is determined whether the register sensor 17 has detected a document Gi or not. If Yes (Y), the processing flow goes to a step ST5. If No (N), the processing flow repeats the step ST4.

In the step ST5, the motor unit M2 is stopped temporarily and the rotation of the respective rolls 1 to 8 is stopped accordingly. Then, the processing flow goes to a step ST6.

In the step ST6, it is determined whether it is the timing to deliver the document Gi to the image reading position 6 or not. If Yes (Y), the processing flow goes to a step ST7. If No (N), the processing flow repeats the step ST6.

In the step ST7, the motor unit M2 is driven and rotated forward and the respective rolls 1 to 8 are rotated forward accordingly. Then, the processing flow goes to a step ST8.

In the step ST8, it is determined whether the discharge sensor 18 has detected the document Gi or not. If Yes (Y), the processing flow goes to a step ST9. If No (N), the processing flow repeats the step ST8.

In the step ST9, it is determined whether the discharge sensor 18 no longer detects the document Gi or not. If Yes (Y), the processing flow goes to a step ST10. If No (N), the processing flow repeats the step ST9.

In the step ST10, it is determined whether the reversal number $n$ is at least two or not (i.e. whether n≥2 or not). If No (N), the processing flow goes to a step ST11. If Yes (Y), the processing flow goes to a step ST16.

In the step ST11, the following processes (1) and (2) are executed. Then, the processing flow goes to a step ST12.
(1) Drive and rotate the motor unit M2 backward
(2) Increment the reversal number $n$ by 1 (i.e. set n=n+1)

In the step ST12, it is determined whether the pre-register sensor 16 has detected the document Gi or not. If Yes (Y), the processing flow goes to a step ST13. If No (N), the processing flow repeats the step ST12.

In the step ST13, the changeover time t1 is set in the timer TM. Then, the processing flow goes to a step ST14.

In the step S14, it is determined whether the time in the timer TM is up or not. That is, it is determined whether the changeover time t1 has elapsed or not. If Yes (Y), the processing flow goes to a step ST15. If No (N), the processing flow repeats the step ST14.

In the step ST15, the motor unit M2 is rotated forward. Then, the processing flow returns to the step ST4.

In the step ST16, it is determined whether the job has been completed or not. If Yes (Y), the processing flow goes to a step ST17. If No (N), the processing flow returns to the step ST2.

In the step ST17, the discharge time t2 is set in the timer TM. Then, the processing flow goes to a step ST18.

In the step ST18, it is determined whether the time in the timer TM is up or not. If Yes (Y), the processing flow goes to a step ST19. If No (N), the processing flow repeats the step ST18.

In the step ST19, the motor unit M2 is stopped. Then, the processing flow returns to the step ST1.

In the step ST20, it is determined whether it is the timing to feed paper or not. If Yes (Y), the processing flow goes to a step ST21. If No (N), the processing flow repeats the step ST20.

In the step ST21, the motor unit M2 is driven and rotated forward and the respective rolls 1 to 8 are rotated accordingly. Then, the processing flow goes to a step ST22.

In the step ST22, it is determined whether the register sensor 17 has detected the document Gi or not. If Yes (Y), the processing flow goes to a step ST23. If No (N), the processing flow repeats the step ST22.

In the step ST23, the motor unit M2 is stopped temporarily and the rotation of the respective rolls 1 to 8 is stopped accordingly. Then, the processing flow goes to a step ST24.

In the step ST24, it is determined whether it is the timing to deliver the document Gi to the image reading position 6 or not. If Yes (Y), the processing flow goes to a step ST25. If No (N), the processing flow repeats the step ST24.

In the step ST25, the motor unit M2 is driven and rotated forward and the respective rolls 1 to 8 are rotated forward accordingly. Then, the processing flow goes to a step ST26.

In the step S26, it is determined whether the discharge sensor 18 has detected the document Gi or not. If Yes (Y), the processing flow goes to a step ST27. If No (N), the processing flow repeats the step ST26.

In the step ST27, it is determined whether the discharge sensor 18 no longer detects the document Gi or not. If Yes (Y), the processing flow goes to a step ST28. If No (N), the processing flow repeats the step ST27.

In the step ST28, it is determined whether the job has been completed or not. If Yes (Y), the processing flow goes to the step ST17. If No (N), the processing flow returns to the step ST20.

(Function of Automatic Feeder U3)

When it is the time to feed paper in the automatic feeder U3 having the aforementioned configuration in Example 2, the motor unit M2 rotates forward. In accordance with this, the nudger roll 1 extracts documents Gi stored in a document tray TG1. The document separation rolls 2 separate the documents Gi extracted by the nudger roll 1 one by one. The takeaway rolls 3 convey the documents Gi separated one by one by the document separation rolls 2. The document register rolls 4 deliver each of the documents Gi toward the downstream-side document reading position 6 in accordance with timing. The out rolls 7 convey the document Gi whose image has been read in the image reading position 6, toward the downstream side.

Figure 14A:
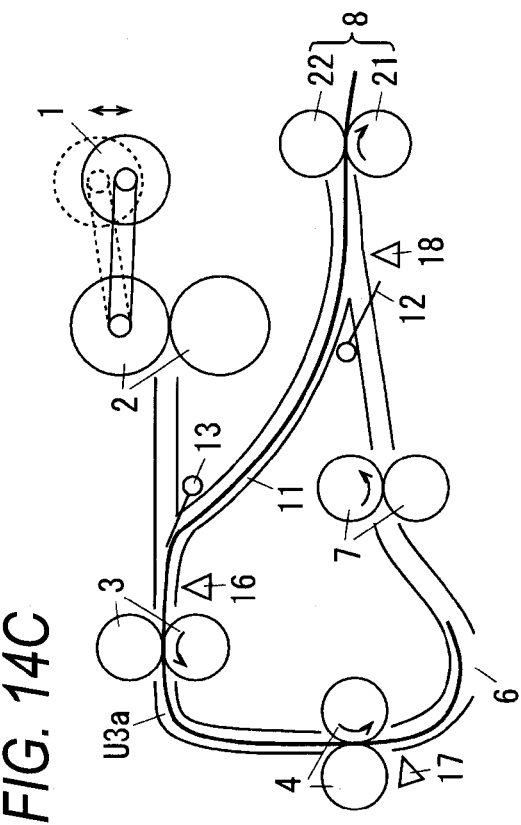
FIGS. 14A, 14B, 14C and 14D are explanatory views of document states during reversal in Example 2, FIG. 14A being an explanatory view of a state in which the rear end of a document has not passed through a discharge sensor yet, FIG. 14B being an explanatory view of a state in which the document having conveyed through a reversal passage has begun to be conveyed by conveyance members again, FIG. 14C being an explanatory view of a state in which reading of a second side of the reversed document has started, FIG. 14D being an explanatory view of a state in which the front end of the document whose second side has been read has entered between discharge members.
Figure 14B:
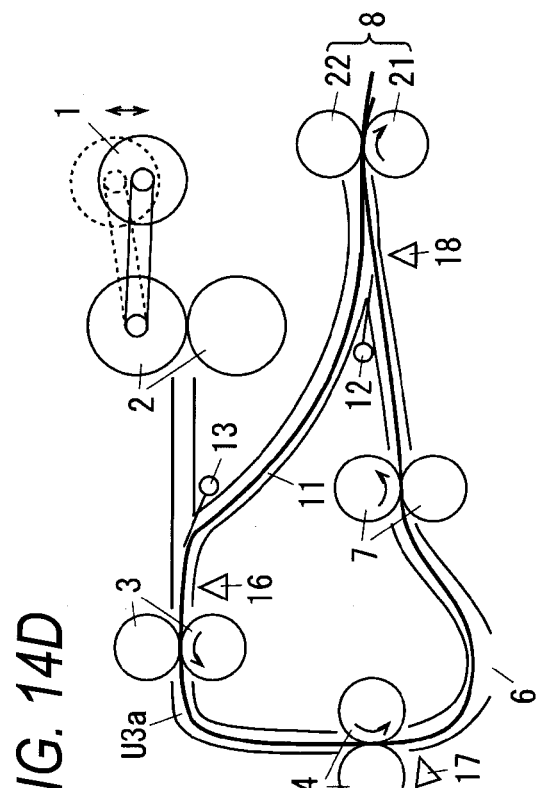
Figure 14C:
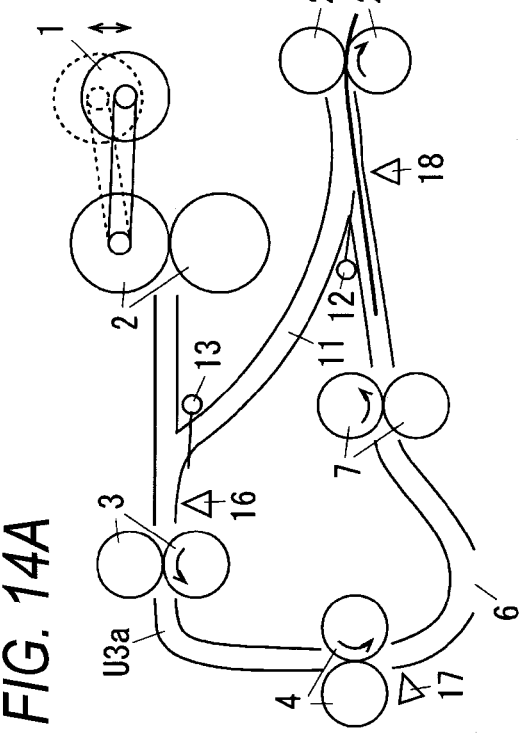
Figure 14D:
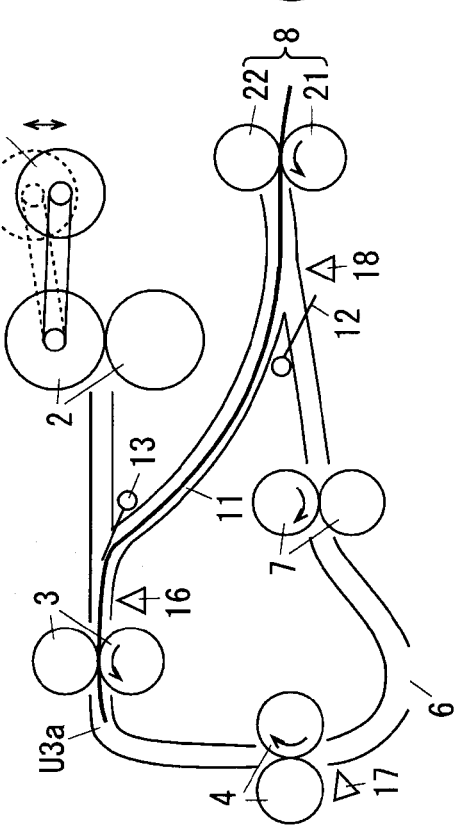

FIGS. 14A to 14D are explanatory views of document states during reversal in Example 2. FIG. 14A is an explanatory view of a state in which a rear end of a document has not passed through the discharge sensor yet. FIG. 14B is an explanatory view of a state in which the document having conveyed through the reversal passage has begun to be conveyed by conveyance members again. FIG. 14C is an explanatory view of a state in which reading of a second side of the reversed document has started. FIG. 14D is an explanatory view of a state in which a front end of the document whose second side has been read has entered between discharge members.

In FIG. 14A, the exit roll 8 conveys the document Gi toward the document discharge tray TG2 in the case of single-side reading.

In FIGS. 14A and 14B, in the case of double-side reading, the motor unit M2 rotates backward and the exit roll 8 rotates backward accordingly as soon as the downstream end of the document in the conveyance direction passes through the discharge sensor 18. Accordingly, the conveyance direction of the front and rear of the document Gi is reversed so that the document Gi can be conveyed toward the document reversal passage 11. The document Gi which has passed through the document reversal passage 11 is conveyed to the takeaway rolls 3 again. The exit roll 8 continues to rotate backward until the changeover time t1 elapses after the front end of the document Gi passes through the pre-register sensor 16. Accordingly, as shown in FIG. 14B, the document Gi is conveyed by the takeaway rolls 3 and the exit roll 8 immediately after the front end of the document Gi arrives at the takeaway rolls 3. However, on this occasion, the document register rolls 4 also rotate backward in conjunction with the exit roll 8. Therefore, paper jamming may occur unless the document register rolls 4 rotate forward before the document Gi arrives at the document register rolls 4. Accordingly, in Example 2, the changeover time t1 is over and the motor unit M2 begins to rotate forward after the document Gi has been delivered to the takeaway rolls 3 and before the document Gi arrives at the document register rolls 4.

When the motor unit M2 begins to rotate forward, the takeaway rolls 3, the document register rolls 4, the out rolls 7 and the exit roll 8 begin to rotate forward in FIG. 14C. The document Gi which has been conveyed by the takeaway rolls 3 etc. passes through the image reading position 6 in the state in which the document Gi has been reversed inside out. Accordingly, an image of the second side can be read.

Incidentally, on this occasion, the exit roll 8 rotates in an opposite direction to the conveyance direction of the document Gi. When the conveyance direction of the document Gi and the rotation direction of the exit roll 8 are different from each other, the document Gi may be pulled from both ends by the takeaway rolls 3 and the exit roll 8. When the conveyance force of the takeaway rolls 3 is not stronger on that occasion, it is not possible to read the second side. Accordingly, it is necessary to set the conveyance force of the takeaway rolls 3 strong.

However, there is a fear that the exit roll 8 may slide or slip against the document Gi conveyed by the takeaway rolls 3 in this state and abrasion etc. may occur in the surface of the document Gi.

According to the background art, the driving roll and the driven roll of the exit roll are separated from each other to cope with this problem. Accordingly, the exit roll runs idle relatively to the movement of the document Gi in order to suppress occurrence of abrasion. However, according to the background art, it is necessary to provide a mechanism which can contact and separate the driving roll and the driven roll with and from each other. Accordingly, the number of components increases to thereby increase the manufacturing cost or it is a problem to secure a space for installing the mechanism.

On the other hand, in Example 2, the torque limiter 39 is disposed on the shaft 38 of the driving roll 21. Accordingly, the torque acting on the exit roll 8 increases when the rotation direction of the exit roll 8 is different from the conveyance direction of the document Gi. Therefore, the torque limiter 39 operates to cut off transmission of the forward rotation driving from the motor unit M2. Accordingly, the exit roll 8 can rotate in the conveyance direction of the document Gi which is conveyed by the takeaway rolls 3 so that the exit roll 8 can rotate following the document Gi. Accordingly, it is possible to suppress occurrence of abrasion in the document Gi and it is not necessary to provide a mechanism which can contact and separate the driving roll 21 and the driven roll 22 with and from each other. Accordingly, the number of components can be reduced so that the manufacturing cost can be reduced, and the size can be reduced since the installation space is not required, in comparison with the background art.

In FIG. 14C and FIG. 14D, assume that the front end of the document Gi whose second side image has been read enters the exit roll 8 again. On this occasion, when the document Gi is long in the conveyance direction, there may be a case where the rear end of the document Gi has not passed through the exit roll 8 yet as shown in FIG. 14D. When the front end of the document Gi arrives at the exit roll 8 in this case, the conveyance direction of the front end of the document Gi is consistent with the rotation direction of the exit roll 8 in the state in which the torque limiter 39 is not operated. Accordingly, the torque acting on the exit roll 8 is so small that the operation of the torque limiter 39 can be cancelled. Thus, the driving from the motor unit M2 can be transmitted. Accordingly, the front end portion of the document Gi can be conveyed toward the document discharge tray TG2.

Figure 15:
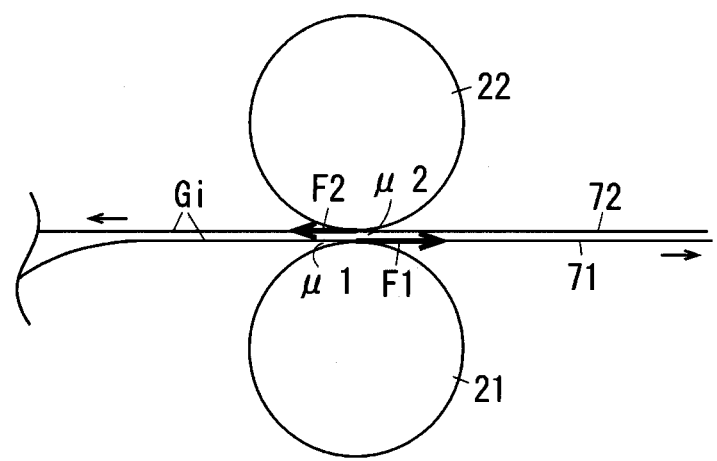
FIG. 15 is an explanatory view of the friction relation in Example 2.

FIG. 15 is an explanatory view of the friction relation in Example 2.

In FIG. 15, assume that $\mu 1 < \mu 2$. In this case, a force F1 with which the exit roll 8 conveys a front end portion 71 of one document Gi toward the document discharge tray TG2 is smaller than a force F2 with which a rear end portion 72 of another document Gi conveys the front end portion 71 of the one document Gi toward the document reversal passage 11. Accordingly, there is a fear that the front end portion 71 of the document Gi may be caught by the rear end portion 72 so that the front end portion 71 of the document Gi may be conveyed toward the document reversal passage 11 to thereby cause paper jamming To solve this problem, in Example 2, $\mu 1$ is set to be larger than μ2 so that the front end portion 71 can be surely conveyed toward the document discharge tray TG2 by the exit roll 8. Accordingly, occurrence of paper jamming can be suppressed.

Particularly, in Example 2, the driving roll 21 of the exit roll 8 is located on the lower side correspondingly to the lower side, through which the front end portion 71 enters, with respect to the rear end portion 72 of the document Gi. Accordingly, the front end portion 71 which has entered can be conveyed by the driving roll 21.

Incidentally, when double-side reading is performed by the automatic feeder U3 in Example 2, each document Gi is conveyed twice to the document reversal passage 11 in accordance with the process of the step ST10. That is, the document Gi is conveyed to the document reversal passage 11 again after the second side reading is completed. Assume that each document Gi is conveyed to the document reversal passage 11 only once. In this case, when a plurality of documents Gi loaded in the document tray TG1 are discharged to the document discharge tray TG2, the sequence of pages of the document Gi is different from that in the document tray TG1. To solve this problem, in Example 2, each documents Gi is conveyed to the document reversal passage 11 again after the second side reading is completed. Thus, the sequence of pages of the documents Gi in the document discharge tray TG2 becomes the same as that in the document tray TG1.

EXAMPLE 3

Next, Example 3 of the invention will be described. Constituent elements corresponding to those in the Example 2 are referred to by the same numerals or signs respectively, and detailed description thereof will be omitted.

This Example has the same configuration as Example 2 except the following point.
(Description about Automatic Feeder According to Example 3)

In an automatic feeder U3 according to Example 3, an electromagnetic clutch 39' as an example of an allowing member and as an example of a changeover member is supported in place of the torque limiter 39 in Example 2. The electromagnetic clutch 39' performs changeover to transmit or not transmit driving of the motor unit M2 to the driving roll 21.

Figure 16:
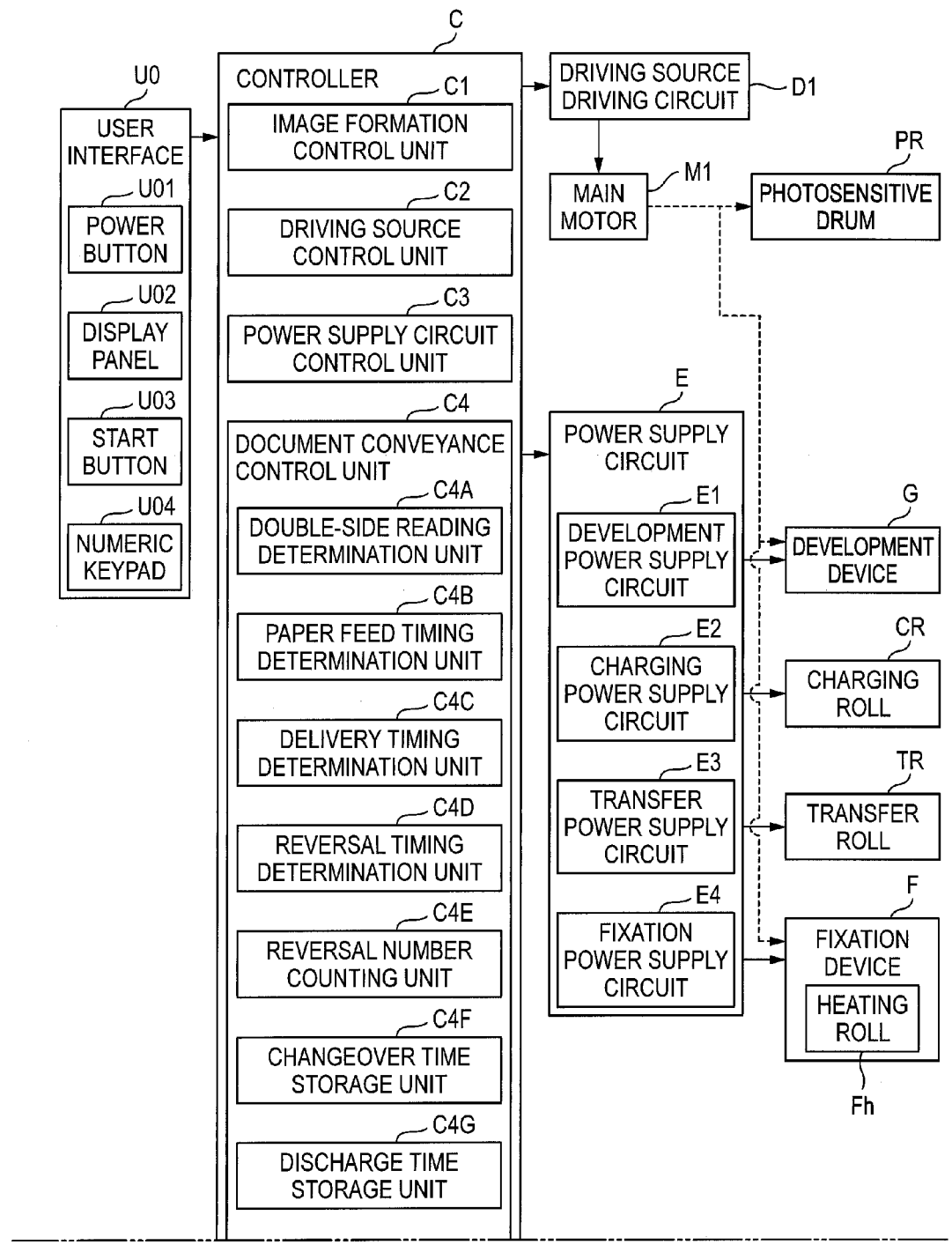
FIG. 16 is a block diagram of Example 3 correspondingly to FIG. 12 of Example 2.

FIG. 16 is a block diagram of Example 3 correspondingly to FIG. 12 of Example 2.

In FIG. 16, a document conveyance control unit C4 in a controller C in Example 3 has not only the respective units C4A to C4J in Example 2 but also an electromagnetic clutch control unit C4K.

The electromagnetic clutch control unit C4K in Example 3 controls operation or non-operation of the electromagnetic clutch 39' through an electromagnetic clutch control circuit D3. As soon as the discharge sensor 18 detects a front end of a document Gi, the electromagnetic clutch control unit C4K in Example 3 turns ON the electromagnetic clutch 39' so as to transmit the driving. When the changeover time t1 has elapsed, the electromagnetic clutch control unit C4K turns OFF the electromagnetic clutch 39' so as not to transmit the driving.
(Description about Flow Chart of Example 3)

Next, the flow of control in the copying machine U according to Example 3 will be described in accordance with a so-called flow chart.

(Description about Flow Chart of Document Conveyance Process in Example 3)

Figure 17:
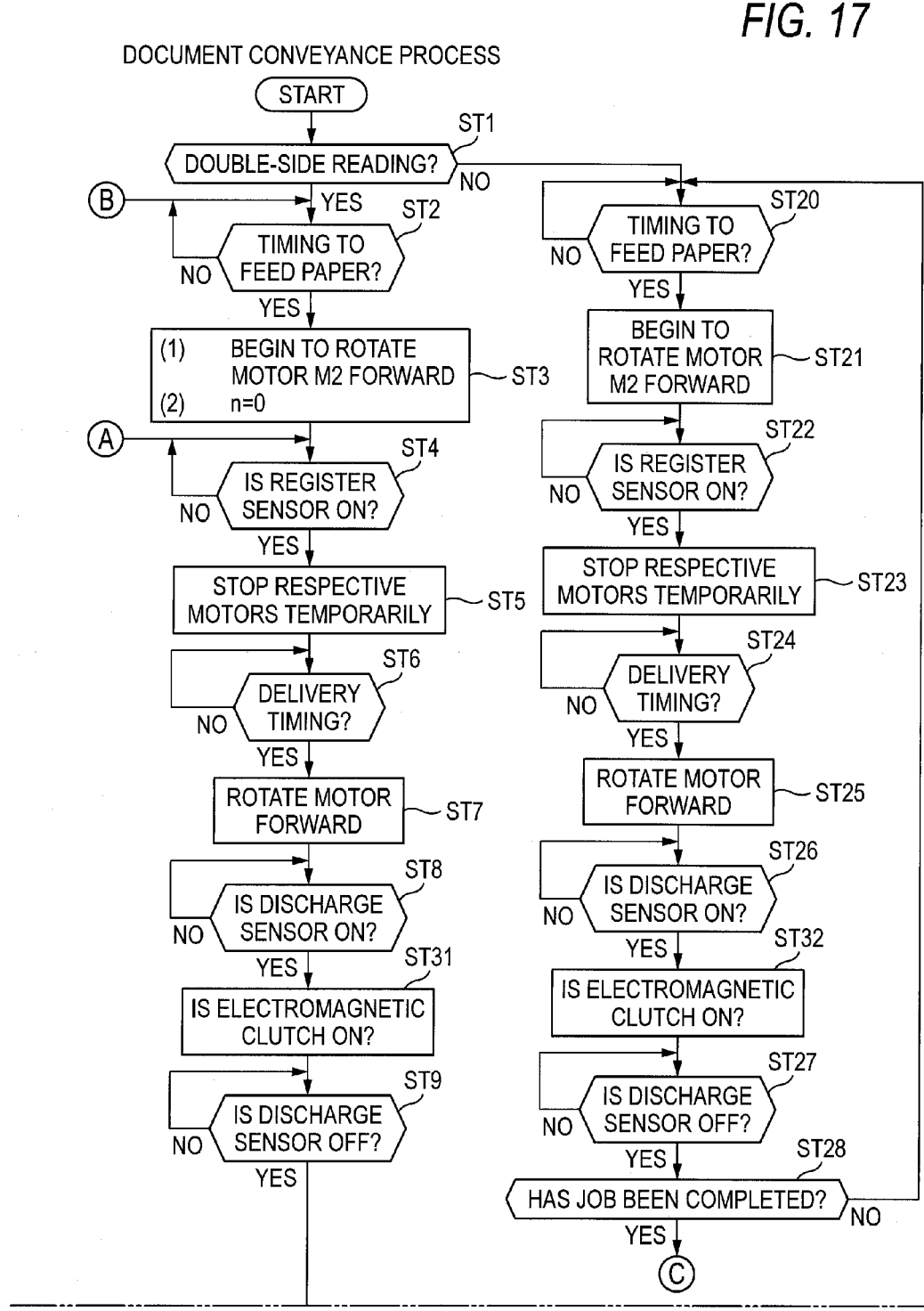
FIG. 17 is an explanatory view of a flow chart of a document conveyance process in Example 3 correspondingly to FIG. 13 of Example 2.

FIG. 17 is an explanatory view of a flow chart of a document conveyance process in Example 3 correspondingly to FIG. 13 of Example 2.

In FIG. 17, the document conveyance process in Example 3 is the same as that in Example 2 except that a step ST31 is executed between the step ST8 and the step ST9 of Example 2, a step ST32 is executed between the step ST26 and the step ST27 of Example 2, and steps ST15' and ST19 are executed in place of the steps ST15 and ST19 of Example 2. Therefore, only the different points will be described.

After the process of the steps ST1 to ST8, the electromagnetic clutch 39' is turned ON in the step S31. Then, the processing flow goes to the step ST9.

After the process of the steps ST9 to ST14, the following processes (1) and (2) are executed in the step ST15'. Then, the processing flow returns to the step ST4.
(1) Rotate the motor unit M2 forward
(2) Turn OFF the electromagnetic clutch 39'

After the process of the steps ST16 to ST18, the following processes (1) and (2) are executed in the step ST19'. Then, the processing flow returns to the step ST1.
(1) Stop the motor unit M2
(2) Turn OFF the electromagnetic clutch 39'

After the process of the steps ST20 to ST26, the electromagnetic clutch 39' is turned ON in the step S32. Then, the processing flow goes to the step ST27.
(Effects of Example 3)

In the automatic feeder U3 having the aforementioned configuration in Example 3, the electromagnetic clutch 39' is installed in place of the torque limiter 39 in Example 2. The electromagnetic clutch 39' is turned ON in the process of the step ST31 or ST32 when the front end of the document Gi enters the exit roll 8. Accordingly, the document Gi can be conveyed toward the downstream side in the conveyance direction in the same manner as in the case shown in FIG. 14A. In addition, in the case where the document Gi is conveyed to the document reversal passage 11, the electromagnetic clutch 39' is kept at an ON state also when the motor unit M2 changes its rotation from forward rotation to backward rotation. Accordingly, the exit roll 8 changes its rotation from forward rotation to backward rotation in accordance with the rotation of the motor unit M2 in the same manner as in the case shown in FIG. 14B.

When the motor unit M2 changes its rotation from backward rotation to forward rotation after a lapse of the changeover time t1, the electromagnetic clutch 39' is turned OFF in the process of the step ST15'. Accordingly, the driving is not transmitted to the driving roll 21 but the driving roll 21 is allowed to rotate freely. Accordingly, the exit roll 8 rotates following the document Gi conveyed by the takeaway rolls 3 in the same manner as in the state shown in FIG. 14C.

When the front end of the document Gi whose second side has been read enters the exit roll 8, the electromagnetic clutch 39' is turned ON in the process of the step ST31. Accordingly, the front end of the document Gi can be conveyed toward the downstream side by the exit roll 8 in the same manner as in the case shown in FIG. 14D.
(Modifications)

Although the Examples of the invention have been described above in detail, the invention is not limited to the aforementioned Examples but may be modified variously within the spirit and scope of the invention described in the scope of claims. Modifications (H01) to (H04) of the invention may be exemplified as follows.

(H01) Although the copying machine U as an example of an image forming apparatus has been exemplified in the Examples, the invention is not limited thereto but may be applied to a printer, a facsimile machine or a complex machine etc. having these functions. In addition, the invention is not limited to an image forming apparatus for monochrome development but may be formed as a so-called color image forming apparatus for multicolor development.

(H02) Although it is desirable that the Examples has the configuration that the document Gi whose second side has been read passes through the reversal passage 11 again, the document Gi whose second side has been read may be conveyed not to the reversal passage 11 but to the document discharge tray TG2.

(H03) Although the configuration of the transmission system in which the document register rolls 4 and the out rolls 7 also rotate backward during backward rotation of the exit roll 8 has been exemplified in the Examples, the invention is not limited thereto. For example, driving of the document register rolls 4 or the out rolls 7 may be transmitted not through the seventh intermediate gear 46 but through the eleventh intermediate gear 66. Thus, the document register rolls 4 or the out rolls 7 can keep on rotating in the same rotation direction and in the same manner as the takeaway rolls 3 regardless of whether the motor unit M2 is rotated forward/backward. In addition, although it is desirable that all the rolls 1 to 8 are driven by one motor unit M2, configuration may be made in such a manner that, for example, only the exit roll 8 is driven by one motor which can rotate forward and backward while the other rolls 1 to 7 are driven by another motor which can rotate only forward. In addition, the number or location relation of gears in the transmission system is not limited to that in the exemplified configuration but any change may be made in accordance with the design or specification etc. For example, the number or locations of gears may be changed.

(H04) Although control is made by use of the changeover time t1 and the discharge time t2 in the Examples, the invention is not limited thereto. For example, the location where the pre-register sensor 16 is installed may be arranged on the downstream side of the takeaway rolls 3 so that processing may be performed only based on the detection result of the pre-register sensor 16 without using the changeover time t1. In addition, any change may be made in accordance with the design or specification etc. For example, reference sensors based on which the respective times t1 and t2 can begin to be counted may be changed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A conveyance device comprising:
a pair of conveyance members;
a connection member that is connected to one of the pair of conveyance members to move one of the conveyance members relatively to other of the conveyance members in such a direction that the pair of conveyance members are contacted with each other or separated from each other;
an operating member that is supported rotatably around a rotation shaft and that has a first engagement portion and a second engagement portion, the first engagement portion being able to be engaged with the connection member so as to bring the pair of conveyance members into contact with each other, the second engagement portion being arranged in a position where a phase of the second engagement portion is shifted from a phase of the first engagement portion by less than 180 degrees in a circumferential direction of the operating member, the second engagement portion being able to be engaged with the connection member so as to separate the pair of conveyance members from each other;
a to-be-stopped member that is supported rotatably in conjunction with the operating member and that has a first to-be-stopped portion disposed correspondingly to the first engagement portion and a second to-be-stopped portion disposed correspondingly to the second engagement portion;
a stopping member that can be engaged with each of the to-be-stopped portions to thereby stop rotation of the to-be-stopped member and that can be moved between an engagement position where the stopping member is engaged with each of the to-be-stopped portions to retain the position of the operating member and a release position where the stopping member is released from the engagement with each of the to-be-stopped portions; and
a contact/separation control unit that controls the stopping member to thereby control contact/separation between the pair of conveyance members, and that moves the stopping member to the engagement position and rotates the operating member by a first rotation amount from the second engagement portion to the first engagement portion in a rotation direction, then moves the stopping member to the release position and rotates the operating member by a second rotation amount that is set in advance to be larger than a rotation amount from the first engagement portion to the second engagement portion, and then moves the stopping member to the engagement position and rotates the operating member by a third rotation amount that is obtained by subtracting the second rotation amount from a rotation amount corresponding to one turn.

2. The conveyance device according to claim 1, further comprising:
a driving transmission system having: a first gear member to which driving from a driving source can be transmitted; a second gear member that is formed integrally with the to-be-stopped member and supported coaxially with the operating member and movably relatively to the operating member and that has a first gear portion and a second gear portion, the first gear portion being formed in an outer circumference of the second gear member so that the driving can be transmitted from the first gear member to the first gear portion when the first gear portion is engaged with the first gear member, the second gear portion being disposed with a circumferential gap from the first gear portion so that the driving can be transmitted from the first gear member to the second gear portion when the second gear portion is engaged with the first gear member, the gap between the first gear portion and the second gear portion being disposed in a position facing the first gear member when each of the to-be-stopped portions is engaged with the stopping member; and a rotation force imparting member that imparts a force to the second gear member to rotate the second gear member in a rotation direction set in advance.

3. The conveyance device according to claim 2, wherein: the pair of conveyance members have a driving member to which the driving can be transmitted and a driven member that is disposed oppositely to the driving member so that the driven member can be rotationally driven with a document put between the driving member and the driven member.

4. The conveyance device according to claim 3, further comprising:
- a document loading portion into which documents can be loaded;
- a document discharge portion to which the documents can be discharged;
- a document conveyance passage that extends from the document loading portion to the document discharge portion via a document reading position;
- the pair of conveyance members that are disposed in the document conveyance passage and that convey each of the documents toward the document discharge portion; and
- a reversal passage that connects an upstream side of the pair of conveyance members and an upstream side of the document reading position in a document conveyance direction so that the document whose second side has to be read can be conveyed through the reversal passage.

5. The conveyance device according to claim 2, further comprising:
- a document loading portion into which documents can be loaded;
- a document discharge portion to which the documents can be discharged;
- a document conveyance passage that extends from the document loading portion to the document discharge portion via a document reading position;
- the pair of conveyance members that are disposed in the document conveyance passage and that convey each of the documents toward the document discharge portion; and
- a reversal passage that connects an upstream side of the pair of conveyance members and an upstream side of the document reading position in a document conveyance direction so that the document whose second side has to be read can be conveyed through the reversal passage.

6. The conveyance device according to claim 1, wherein: the pair of conveyance members have a driving member to which the driving can be transmitted and a driven member that is disposed oppositely to the driving member so that the driven member can be rotationally driven with a document put between the driving member and the driven member.

7. The conveyance device according to claim 6, further comprising:
- a document loading portion into which documents can be loaded;
- a document discharge portion to which the documents can be discharged;
- a document conveyance passage that extends from the document loading portion to the document discharge portion via a document reading position;
- the pair of conveyance members that are disposed in the document conveyance passage and that convey each of the documents toward the document discharge portion; and
- a reversal passage that connects an upstream side of the pair of conveyance members and an upstream side of the document reading position in a document conveyance direction so that the document whose second side has to be read can be conveyed through the reversal passage.

8. The conveyance device according to claim 1, further comprising:
- a document loading portion into which documents can be loaded;
- a document discharge portion to which the documents can be discharged;
- a document conveyance passage that extends from the document loading portion to the document discharge portion via a document reading position;
- the pair of conveyance members that are disposed in the document conveyance passage and that convey each of the documents toward the document discharge portion; and
- a reversal passage that connects an upstream side of the pair of conveyance members and an upstream side of the document reading position in a document conveyance direction so that the document whose second side has to be read can be conveyed through the reversal passage.

9. An image reading device comprising:
- an image sensing member that can read an image of a document; and
- the conveyance device according to claim 1 that conveys a document to a reading position in which the image sensing member can read the document.

10. An image forming apparatus comprising:
- the image reading device according to claim 9 that can read an image of a document; and
- an image recording device that can record the image read by the image reading device into a medium.

11. A document conveyance device comprising:
- a document loading portion in which documents are loaded;
- a document discharge portion to which the documents are discharged;
- a discharge member that is disposed on a downstream side of a document reading position in a document conveyance direction and that discharges each of the documents;
- a reversal passage that connects an upstream side of the discharge member and an upstream side of the reading position in the document conveyance direction so that each of the documents can be conveyed to the reversal passage when the document is reversed inside out;
- a discharge member control unit that rotates the discharge member forward when the document is conveyed to the document discharge portion and that rotates the discharge member backward when the document is conveyed to the reversal passage; and
- a transmission system that transmits driving from a driving source to the discharge member and that has an allowing member allowing the discharge member to rotate in the backward rotation direction when the driving source generates driving to rotate the discharge member forward and the document is laid between the discharge member and a conveyance member.

12. The document conveyance device according to claim 11, wherein:
the discharge member has a driving member to which the driving can be transmitted from the transmission system, a driven member that can be driven and rotated when making contact with the driving member, and a pressing member that presses one of the driven member and the driving member in a direction to bring the driven member and the driving member into contact with each other.

13. The document conveyance device according to claim 12, wherein:
the allowing member includes a cutting-off member that cuts off a forward rotation driving force from the driving source toward the discharge member when a preset force smaller than a backward rotation force acting on the discharge member acts on the discharge member in accordance with a document conveyance force of the conveyance member in the state in which the document is laid between the conveyance member and the discharge member.

14. The document conveyance device according to claim 12, wherein:
the allowing member includes a changeover member that changes over between transmission and non-transmission of driving from the driving source to the discharge member, and that transmits the driving when the discharge member conveys the document to the document discharge portion, but does not transmit the driving to the discharge member when the driving source generates the driving to rotate the discharge member forward and the document is laid between the conveyance member and the discharge member.

15. The document conveyance device according to claim 12, wherein:
a friction coefficient between each of the documents and the discharge member is larger than a friction coefficient between adjacent ones of the documents.

16. The document conveyance device according to claim 11, wherein:
the allowing member includes a cutting-off member that cuts off a forward rotation driving force from the driving source toward the discharge member when a preset force smaller than a backward rotation force acting on the discharge member acts on the discharge member in accordance with a document conveyance force of the conveyance member in the state in which the document is laid between the conveyance member and the discharge member.

17. The document conveyance device according to claim 11, wherein:
a friction coefficient between each of the documents and the discharge member is larger than a friction coefficient between adjacent ones of the documents.

18. The document conveyance device according to claim 11, wherein:
the allowing member includes a changeover member that changes over between transmission and non-transmission of driving from the driving source to the discharge member, and that transmits the driving when the discharge member conveys the document to the document discharge portion, but does not transmit the driving to the discharge member when the driving source generates the driving to rotate the discharge member forward and the document is laid between the conveyance member and the discharge member.

19. An image reading device comprising:
an image sensing member that can read an image of a document; and
the document conveyance device according to claim 11 that conveys a document to a reading position where the image sensing member can read the document.

20. An image forming apparatus comprising:
the image reading device according to claim 19 that can read an image of a document; and
an image recording device that can record the image read by the image reading device into a medium.

* * * * *